United States Patent
Zhao et al.

(10) Patent No.: US 10,671,744 B2
(45) Date of Patent: Jun. 2, 2020

(54) LIGHTWEIGHT TRUSTED EXECUTION FOR INTERNET-OF-THINGS DEVICES

(71) Applicant: INTEL CORPORATION, Santa Clara, CA (US)

(72) Inventors: Li Zhao, Beaverton, OR (US); Manoj R. Sastry, Portland, OR (US); Arnab Raha, West Lafayette, IN (US)

(73) Assignee: Intel Corporation, Santa Clara, CA (US)

(*) Notice: Subject to any disclaimer, the term of this patent is extended or adjusted under 35 U.S.C. 154(b) by 401 days.

(21) Appl. No.: 15/190,396

(22) Filed: Jun. 23, 2016

(65) Prior Publication Data

US 2017/0372088 A1 Dec. 28, 2017

(51) Int. Cl.
G06F 21/62 (2013.01)
(52) U.S. Cl.
CPC ............... G06F 21/6218 (2013.01)
(58) Field of Classification Search
CPC .................................................. G06F 21/6218
USPC .............................................................. 726/1
See application file for complete search history.

(56) References Cited

U.S. PATENT DOCUMENTS

| | | | |
|---|---|---|---|
| 2004/0177261 A1* | 9/2004 | Watt | G06F 12/1491 713/193 |
| 2008/0250217 A1 | 10/2008 | Kershaw et al. | |
| 2010/0235598 A1 | 9/2010 | Bouvier | |
| 2013/0205403 A1 | 8/2013 | Grocutt et al. | |
| 2014/0122820 A1 | 5/2014 | Park et al. | |
| 2015/0089173 A1 | 3/2015 | Chhabra et al. | |
| 2015/0188949 A1* | 7/2015 | Mahaffey | H04L 63/20 726/1 |

FOREIGN PATENT DOCUMENTS

KR 10-2016-0031541 3/2016

OTHER PUBLICATIONS

International Search Report and Written Opinion dated Aug. 8, 2017, on application No. PCT/US2017/033846.

* cited by examiner

*Primary Examiner* — Khalil Naghdali
(74) *Attorney, Agent, or Firm* — Lowenstein Sandler LLP

(57) ABSTRACT

Lightweight trusted execution technologies for internet-of-things devices are described. In response to a memory request at a page unit from an application executing in a current domain, the page unit is to map a current virtual address (VA) to a current physical address (PA). The policy enforcement logic (PEL) reads, from a secure domain cache (SDC), a domain value (DID) and a VA value that correspond to the current PA. The PEL grants access when the current domain and the DID correspond to the unprotected region or the current domain and the DID correspond to the secure domain region, the current domain is equal to the DID, and the current VA is equal to the VA value. The PEL grants data access and denies code access when the current domain corresponds to the secure domain region and the DID corresponds to the unprotected region.

24 Claims, 18 Drawing Sheets

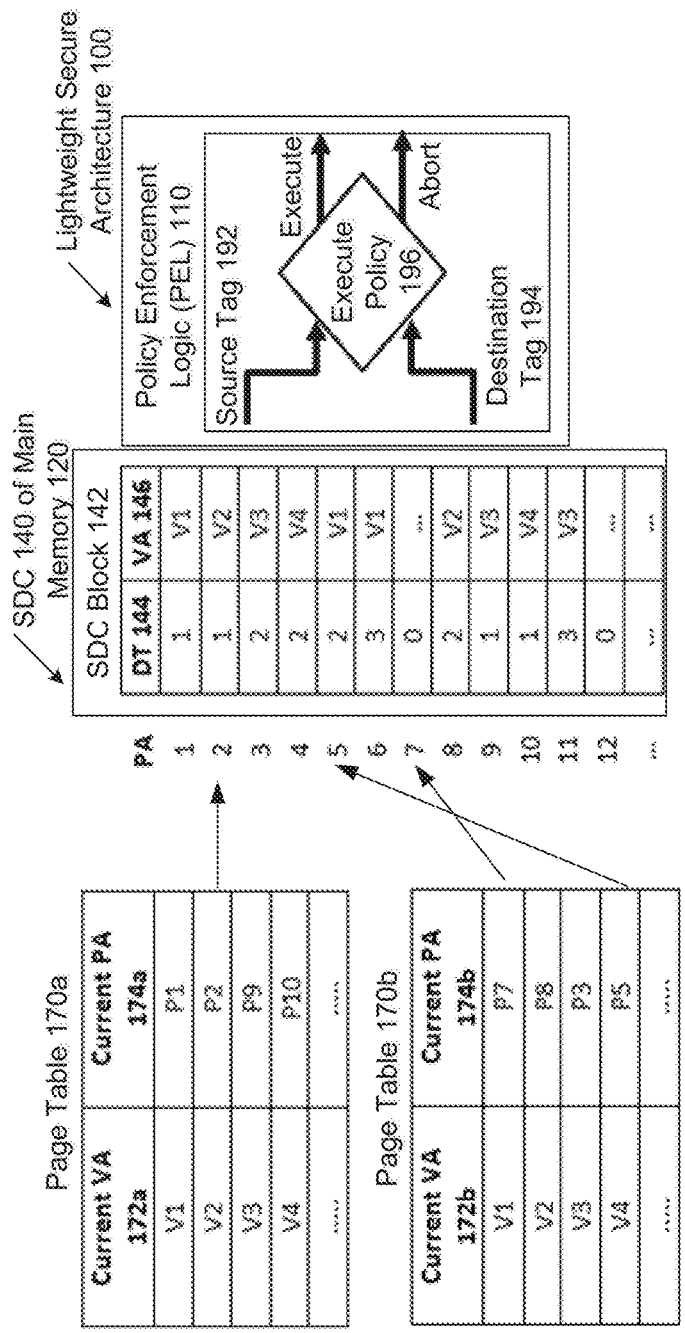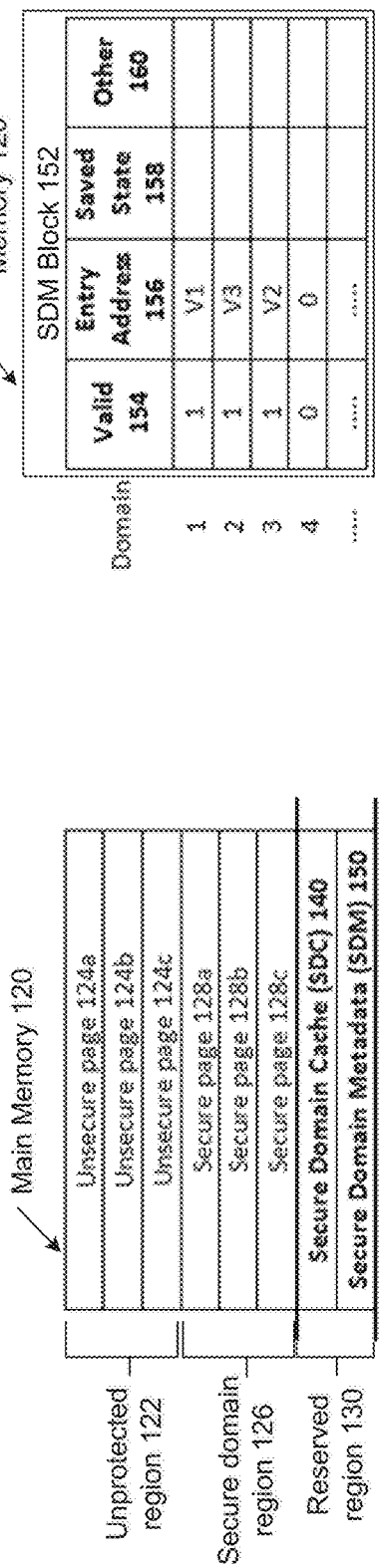
FIG. 1A
FIG. 1B
FIG. 1C

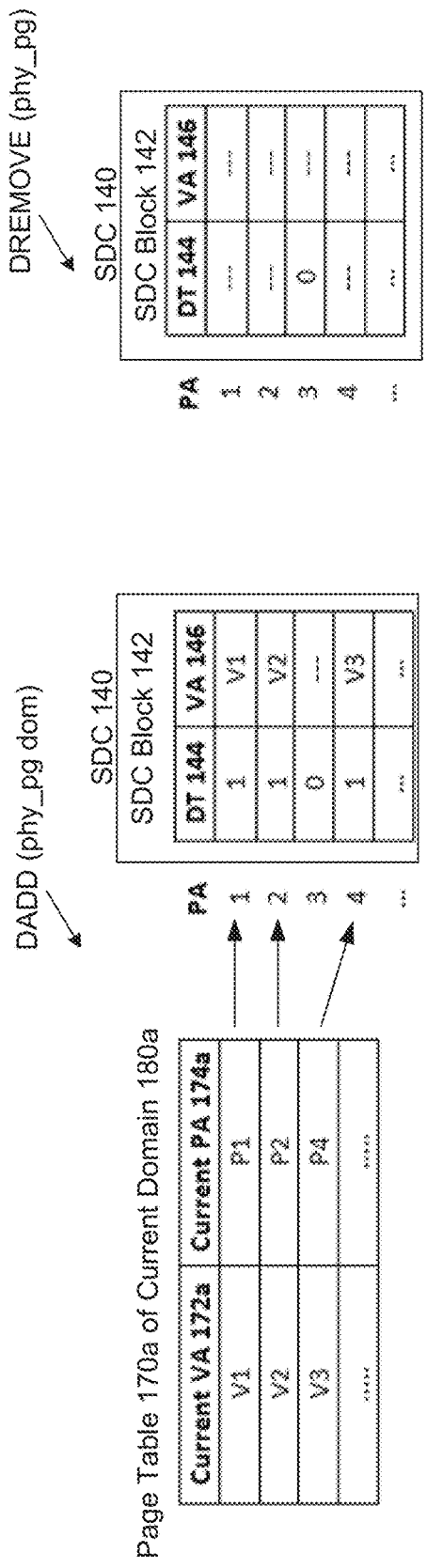
FIG. 8A
FIG. 8B
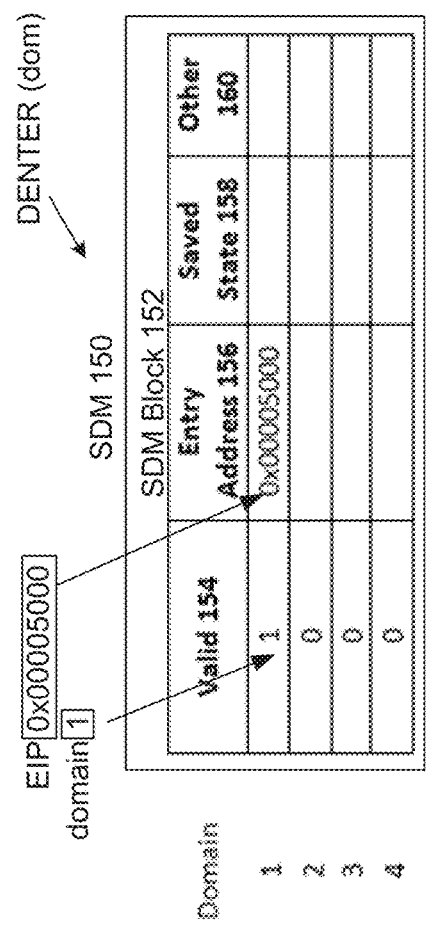
FIG. 8C
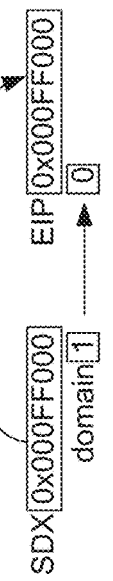
FIG. 8D

FIG. 8E DCREATE

SDM 150

| SDM Block 152 | | | |
|---|---|---|---|
| Domain | Valid 154 | Entry Address 156 | Saved State 158 | Other 160 |
| 1 | 1 | 0x00005000 | | |
| 2 | 0 | | | |
| 3 | 0 | | | |
| 4 | 0 | | | |

FIG. 8F DDESTROY

SDM 150

| SDM Block 152 | | | |
|---|---|---|---|
| Domain | Valid 154 | Entry Address 156 | Saved State 158 | Other 160 |
| 1 | 0 | --- | --- | |
| 2 | 0 | | | |
| 3 | 0 | | | |
| 4 | 0 | | | |

LIGHTWEIGHT TRUSTED EXECUTION FOR INTERNET-OF-THINGS DEVICES

BRIEF DESCRIPTION OF THE DRAWINGS

FIG. 1A illustrates policy enforcement logic (PEL) of lightweight secure architecture coupled to secure domain cache (SDC) of main memory, according to one embodiment.

FIG. 1B illustrates the main memory to be coupled to the lightweight secure architecture, according to one embodiment.

FIG. 1C illustrates secure domain metadata (SDM) of the main memory, according to one embodiment.

FIG. 8A illustrates the DADD instruction in the lightweight secure architecture, according to one embodiment.

FIG. 8B illustrates the DREMOVE instruction in the lightweight secure architecture, according to one embodiment.

FIG. 8C illustrates the DENTER instruction in the lightweight secure architecture, according to one embodiment.

FIG. 8D illustrates the DEXIT instruction in the lightweight secure architecture, according to one embodiment.

FIG. 8E illustrates the DCREATE instruction in the lightweight secure architecture, according to one embodiment.

FIG. 8F illustrates the DDESTROY instruction in the lightweight secure architecture, according to one embodiment.

DESCRIPTION OF EMBODIMENTS

Figure 2:
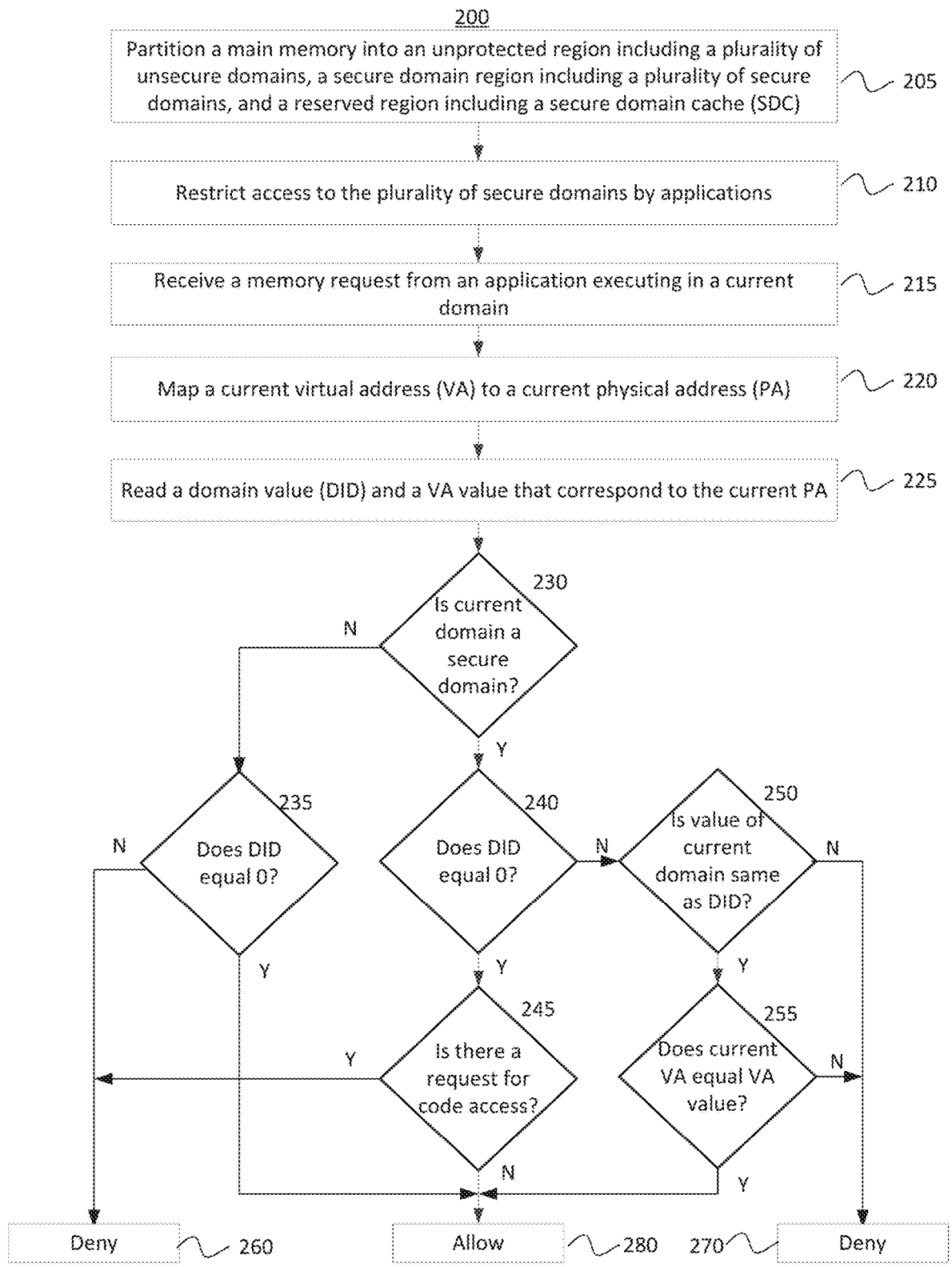
FIG. 2 is a flow diagram of a method of implementation of the lightweight secure architecture, according to one embodiment.

Internet-of-Things (IoT) includes communication services that communicate with an intermediate layer which communicates with "things" in use. The communication services (e.g., service provider network, and so forth) may be coupled with big-data analytics (e.g., analytics, datacenter, servers, storage, and so forth). The intermediate layer may be known as an IoT edge device. The "things" in use may include sensors and actuators and may be used in many different environments (e.g., industry, labs, home automation and management, personal items, wearables, public places, transport, defense, and so forth). The rapid development of the IoT ecosystem has given rise to a new class of memory management unit (MMU) based smart IoT edge devices (e.g., smart gateways, aggregators, routers, and so forth) which are capable of running basic operating systems with limited energy resources. A lightweight architecture solution of trusted execution is a challenge for IoT edge devices due to area and power constraints of the IoT edge devices.

Memory protection units (MPU) based systems are computer-based, are simple, and have low power usage. A simple MPU or range register based architectures may operate on bare physical memory. At the other extreme, MMU-based platforms have higher power consumption, are more complex, and cost more than MPU-based systems. MMU-supported secure architectures target high-end client server and cloud computing.

There is a need for a lightweight secure architecture which provides the simplicity of MPU-based systems (e.g., low power usage) and is still applicable to MMU-based platforms. The lightweight secure architecture should isolate software modules using internal hardware in an MMU-based tiny core and should enable secure execution environment on tiny cores (e.g., Quark) driving the realm of IoT. The challenges include IoT constraints such as limited power or energy overhead and limited area overhead. The lightweight secure architecture should enable a secure execution environment against adversaries such as unprivileged software adversary, system software adversary, and network adversary.

A lightweight secure architecture is described herein. The lightweight secure architecture provides hardware-based, trusted execution in tiny processors (e.g., Quark, microprocessors), aggregators, microcontrollers, and so forth for IoT devices and wearables. The disclosure provides confidentiality and integrity of software modules using additional hardware and architecture extensions to an MMU-based processor core. Physical memory is partitioned into secure domains and unsecure domains using internal data structures and custom instructions. A secure portion of an application is allocated in a secure domain. Each secure domain can only access its own data, stack and execute its own code, and not of any other domain (e.g., secure domains that belong to an application can be only accessed by the same application). Hardware is responsible for allocating, managing, and deleting the secure domains so that security is guaranteed even if system software is compromised.

FIG. 1A illustrates a lightweight secure architecture 100 coupled to secure domain cache (SDC) 140 of main memory 120, according to one embodiment. A lightweight secure architecture may include a policy enforcement logic (PEL) 110 coupled to main memory 120 (see FIG. 1B).

FIG. 1B illustrates the main memory 120 to be coupled to the lightweight secure architecture 100, according to one embodiment. The lightweight secure architecture 100 (e.g., page unit 516 of FIG. 4) may partition main memory 120 (e.g., physical memory) into secure domains (SD) pertaining to each secure software module so that the data belonging to different SDs are mutually exclusive (i.e., each SD can only access its own data and stack and execute its own code and not of any other domain). Hardware is responsible for allocating, managing, and deleting these domains to keep even the operating system (OS) out of the trust boundary. Main memory 120 may include an unprotected region 122, a secure domain region 126, and a reserved region 130. The unprotected region 122 may include unsecure pages 124a, 124b, 124c, and so forth (hereinafter unsecure page 124). Secure domain region 126 may include secure pages 128a, 128b, 128c, and so forth (hereinafter secure pages 128). Each unsecure page 124 and secure page 128 may be 4 KB. Reserved region 130 may include a secure domain cache (SDC) 140 (see FIG. 1A) and a secure domain metadata (SDM) 150 (see FIG. 1C). The SDC 140 and SDM 150 include the control information. In one embodiment, one or more of the SDC 140 and the SDM 150 can be implemented as registers. Being stored in the reserved region 130 (e.g., protected region) of the main memory is useful for scalability of SDC 140 and SDM 150. The size of SDC 140 increases with the number of domains and the total memory to be located in a domain. In one embodiment, one or both of SDM 150 and SDC 140 may be implemented as a register array for limited memory support.

In one embodiment, if the main memory 120 is 64 MB, the secure domain region 126 is 4 MB, and 16 secure domains are supported, there will be 16 entries in SDM 150, and 1024 entries in SDC 140. If the implementation is register based, the SDM 150 and SDC 140 read and write latency is 1 cycle.

FIG. 1C illustrates the SDM 150 of the main memory 120, according to one embodiment. The SDM 150 may be used to manage secure domain region 126 in physical memory (e.g., main memory 120). The SDM 150 may include a SDM block 152 that includes information such as one or more of valid 154 (e.g., a value of one if there is a valid entry for a SD, a value of zero if there is not a valid entry for a SD), entry address 156 (e.g., virtual or linear address (VA) of the SD entry), saved state 158 (e.g., saved state during context switch, a pointer to the saved state within the secure domain region 126, saved state area (SSA)), other 160 (e.g., number of pages, number of hashes), and so forth. In one embodiment, the SDM 150 has one entry per SD. In another embodiment, each row in the SDM block 152 may correspond to a domain. In another embodiment, the SDM 150 checks whether a domain is currently in use using the valid bit in the SDM block 152 (located in valid 154).

Returning to FIG. 1A, the SDC 140 is used to tag the physical pages (e.g., one or more pages in page table 170a, one or more pages in page table 170b, etc. (hereinafter page table 170)) with respective secure domain tags (DT) 144 (e.g., 1, 2, 3, etc.).

Each entry of page table 170 may correspond to a process that allocates a domain number 180a, 180b, and so forth (hereinafter current domain 180; each process may contain one or more secure pages 128 from secure domain region 126 as well as one or more unsecure pages 124 from unprotected region 122). In one embodiment, the destination domain number is obtained by looking up the SDC through physical address. In another embodiment, the source domain number (e.g., current domain) is set when a DENTER instruction is executed, as discussed in greater detail below. For example, the domain number is set in the current domain register and whenever the process enters the secure domain by executing the DENTER instruction, that register will capture its domain ID.

In one embodiment, one page table can be associated with one process. Each entry in the page table can indicate a mapping from virtual page to physical page that are allocated to this process. For example, one entry in the page table corresponds to one page and this process may have allocated one secure domain, such as number 1. The process may have also allocated several pages from the secure domain memory. The process may have also allocated several pages from the unsecure domain memory, such as number 0 by default. In this example, the process page table may show N entries, including one or more entries belonging to the secure domain number 1 and one or more other entries belong to the unsecure domain. The domain number may be found by looking up the SDC using a physical address and finding its corresponding domain number.

Each page table 170 may store a plurality of current VAs 172, where each current VA 172 is mapped to a corresponding current physical address (PA) 174 (e.g., main memory 120 may include a plurality of PAs). The current PA 174 (e.g., physical page) is used to check whether the mapping of VA to PA is modified or not (e.g., modified by malicious software).

The SDC 140 may also host R/W/X permissions corresponding to each PA. The SDC 140 may include a SDC block 142 that includes one entry for each 4 kilobyte (KB) page (e.g., protected page 128) in secure domain region 126. Each entry may have a DT 144 and a VA 146 and may correspond to a PA in main memory 120. The secure domain tag (DT) 144 of SDC 140 indicates which SD the entry belongs to. The VA value 146 of SDC 140 is to protect virtual-to-physical (v2p) mapping. Any un-allocated physical page in secure domain region 126 may be tagged with a domain value (DID) of 0.

Lightweight secure architecture 100 may also have policy enforcement logic (PEL) 110 inside the Page Unit 516 (see FIGS. 4-6) to enforce access control. The PEL 110 executes policy 196. The PEL 110 receives the source tag 192 (e.g., the current VA 172, the physical address PA 174, and the current domain number 180) of a memory request and the corresponding destination tag 194 (e.g., DT 144, VA 146). When the source tag 192 and the destination tag 194 match, the PEL 110 executes (e.g., allow data access while denying code access, allowing data and code access, and so forth). When the source tag 192 and the destination tag 194 do not match, the PEL 110 aborts (e.g., does not allow access to the secure domain).

In response to a memory request that includes a current domain 180, a current VA 172, and a current PA 174, the PEL 110 may read, from the SDC 140, a domain value (DID) (e.g., from DT 144) and a VA value (e.g., from VA 146) that correspond to the current PA 174. The PEL 110 may be coupled to a main memory 120 divided into an unprotected region 122 including a plurality of unsecure pages 124, a secure domain region 126 comprising a plurality of secure pages 128, and a reserved region 130 comprising the SDC 140. When the current domain 180 corresponds to the unprotected region 122 (e.g., is not a secure domain, current execution is in un-trusted world) and the DID from DT 144 corresponds to the secure domain region 126, PEL 110 will deny access. When the current domain 180 and the DID from DT 144 correspond to the unprotected region 122 (e.g., current domain 180 is not a secure domain, DID is zero), PEL 110 will grant access. When the current domain 180 corresponds to the secure domain region 126 and the DID from DT 144 corresponds to the unprotected region 122 (e.g., DID is zero), PEL will grant data access and deny code access (e.g., un-trusted world is being accessed). When the current domain 180 and the DID from DT 144 correspond to the secure domain region 126 (e.g., a secure domain is being accessed), the current domain 180 is equal to the DID from DT 144, and the current VA 172 is equal to the VA 146 value, PEL will grant access. When the current domain 180 and the DID from DT 144 correspond to the secure domain region 126 and at least one of the current domain 180 is not equal to the DID from 144 or the current VA 172 is not equal to the VA 146 value, PEL will deny access.

For example, page table 170a includes a current VA 172a of V2 and a corresponding current PA 174a of P2. The PA of P2 corresponds to the DT 144 of 1 and VA 146 of V2 in the SDC 140. The source tag 192 from the page table 170a is a VA of V2 and the value of the current domain 180a. The destination tag 194 from SDC 140 is a VA 146 of V2 and a DT 144 of 1. The PEL 110 receives both the source tag 192 and the destination tag 194. When the current domain 180a is a secure domain and has a value of 1, enforce policy 196 of PEL 110 determines that the source tag 112 and the destination tag 194 match and the PEL 110 executes (e.g., allows access to the secure domain). When the current domain 180a is a secure domain and has a value other than 1, enforce policy 196 of PEL 110 determines that the source tag 112 and the destination tag 194 do not match and the PEL 110 aborts (e.g., does not allow access to the secure domain). When the current domain 180a is not a secure domain, the PEL 110 aborts.

In another example, page table 170b includes a current VA 172b of V4 and a current PA of P5. The PA of P5 corresponds to the DT 144 of 2 and VA 146 of V1 in the SDC 140. The source tag 192 from the page table 170b is a VA of V5 and the value of the current domain 180b. The destination tag 194 from SDC 140 is a VA 146 of V1 and a DT 144 of 2. The PEL 110 receives both the source tag 192 and the destination tag 194. When the current domain 180b is a secure domain, enforce policy 196 of PEL 110 determines that the source tag 192 and the destination tag 194 do not match (current VA 172 b and VA 146 do not match) and the PEL 110 aborts. When the current domain 180b is not a secure domain, the PEL 110 aborts (DID does not equal zero).

In another example, page table 170b includes a current VA 172b of V1 and a current PA 174b of P7. The PA of P7 corresponds to the DT 144 of 0 in the SDC 140. If the current domain 180b is a secure domain, then enforce policy 196 of PEL 110 determines to allow data access and deny code access. If the current domain 180b is not a secure domain, the enforce policy 196 of PEL 110 determines to allow access.

In one embodiment, the lightweight secure architecture 100 is lightweight in part because of single threaded execution. In another embodiment, the lightweight secure architecture 100 is lightweight in part because of simple data structures (e.g., SDC 140, SDM 150). In another embodiment, the lightweight secure architecture 100 is lightweight in part because of low latency instructions. In another embodiment, the lightweight secure architecture 100 is lightweight in part because of simple lookup (e.g., direct mapped) in access control.

In one embodiment, the mapping is restricted to a region of dynamic random access memory (DRAM) and the total number of secure domains is restricted. In another embodiment, the secure domains can be carried within TLB to minimize access latency. In another embodiment, the lightweight secure architecture 100 is standalone and can be entirely isolated (e.g., gated) when access control is not required.

The lightweight secure architecture 100 may include integrity measurement and attestation. In another embodiment, secure interrupt handling is implemented. In another embodiment, the lightweight secure architecture 100 is implemented on field programmable gate array (FPGA) and running real OS on top of it. In another embodiment, the area is 19464 GEs for a register based and 786 for memory based. The power is 70.55 µW for register based and 60.66 µW for memory based.

The lightweight secure architecture 100 may be a lightweight trusted execution framework for Quark class MMU based platforms. The lightweight secure architecture 100 may be flexible, scalable, area-efficient (e.g., less than 1 KGE area), energy-efficient (about 55 µW power overhead), and low latency (e.g., instruction latencies).

FIG. 2 is a flow diagram of a method 200 of implementation of the lightweight secure architecture 100, according to one embodiment. Method 200 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 200 may be performed, in part, by the lightweight secure architecture 100 of FIG. 1. In another embodiment, method 200 may be performed, in part, by microprocessor 500 of FIG. 5. In another embodiment, method 200 may be performed, in part, by processor 1000 of FIG. 10. In another embodiment, method 200 may be performed on one or more of an aggregator, a microcontroller, and so forth.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

Referring to FIG. 2, at block 205, the processing logic partitions, by a page unit of a core of a processor, a main memory into an unprotected region comprising a plurality of unsecure domains, a secure domain region comprising a plurality of secure domains, and a reserved region comprising a secure domain cache (SDC) and SDM. The core includes a single thread of execution. The core includes a bus unit to couple to the main memory, a prefetch unit coupled to the bus unit, and the page unit coupled to the prefetch unit. The page unit comprises policy enforcement logic (PEL).

At block 210, the processing logic restricts, by the page unit, access to the plurality of secure domains by applications executing by the core. The restricting may provide hardware-based, trusted execution of the applications.

At block 215, the processing logic receives a memory request at the page unit from an application executing in a current domain. In one embodiment, the current domain is express in the memory request. In another embodiment, the processing logic determines the current domain from the source of the memory request.

At block 220, the processing logic maps a current virtual address (VA) to a current physical address (PA) using a page table in response to the receiving of the memory request.

At block 225, the processing logic reads, by the PEL from the SDC, a domain value (DID) and a VA value that correspond to the current PA.

At block 230, the processing logic determines if the current domain 180 is a secure domain (e.g., is located in SDM 126). If the processing logic determines that the current domain is not a secure domain, the flow proceeds to block 235. If the processing logic determines that the current domain is not a secure domain, the flow proceeds to block 240.

At block 235, the processing logic determines if the DID is zero. If the processing logic determines that DID is zero, the flow proceeds to block 280 to allow (e.g., grant access when the current domain and the DID correspond to the unprotected region). If the processing logic determines that DID is not zero, the flow proceeds to block 260 to deny (e.g., deny access when the current domain corresponds to the unprotected region and the DID corresponds to the secure domain region).

At block 240, the processing logic determines if the DID is zero. If the processing logic determines the DID is zero, the flow proceeds to block 245. If the processing logic determines the DID is not zero, flow proceeds to block 250.

At block 245, the processing logic determines if there is a request for code access. If the processing logic determines there is a request for code access, the flow proceeds to block 260 to deny code access. If the processing logic determines there is not a request for code access, flow proceeds to block 280 to allow data access (e.g., grant data access and deny code access when the current domain corresponds to the secure domain region and the DID corresponds to the unprotected region).

At block 250, the processing logic determines if the current domain 180 equals the DID from SDC 140. If the processing logic determines the current domain 180 equals DID, then flow proceeds to block 255. If the processing logic determines the current domain 180 does not equal DID, then flow proceeds to block 270 to deny.

At block 255, the processing logic determines if the destination virtual address 146 equals the VA 146 from SDC 140. If the processing logic determines the destination virtual address 146 equals the current VA 172, the flow proceeds to block 280 to allow (e.g., grant access when the current domain and the DID correspond to the secure domain region, the current domain is equal to the DID, and the current VA is equal to the VA value). If the processing logic determines the destination virtual address 146 does not equal the current VA 142, the flow proceeds to block 270 to deny (e.g., deny access when the current domain and the DID correspond to the secure domain region and at least one of the current domain is not equal to the DID or the current VA is not equal to the VA value).

If flow proceeds to block 260 or 270 to deny and if SDC 140 is implemented in the main memory 120, the entry of SDC 140 may be cached into the translation lookaside buffer (TLB) (e.g., TLB 522 of FIG. 5B) when a first page fault occurs.

Figure 3A:
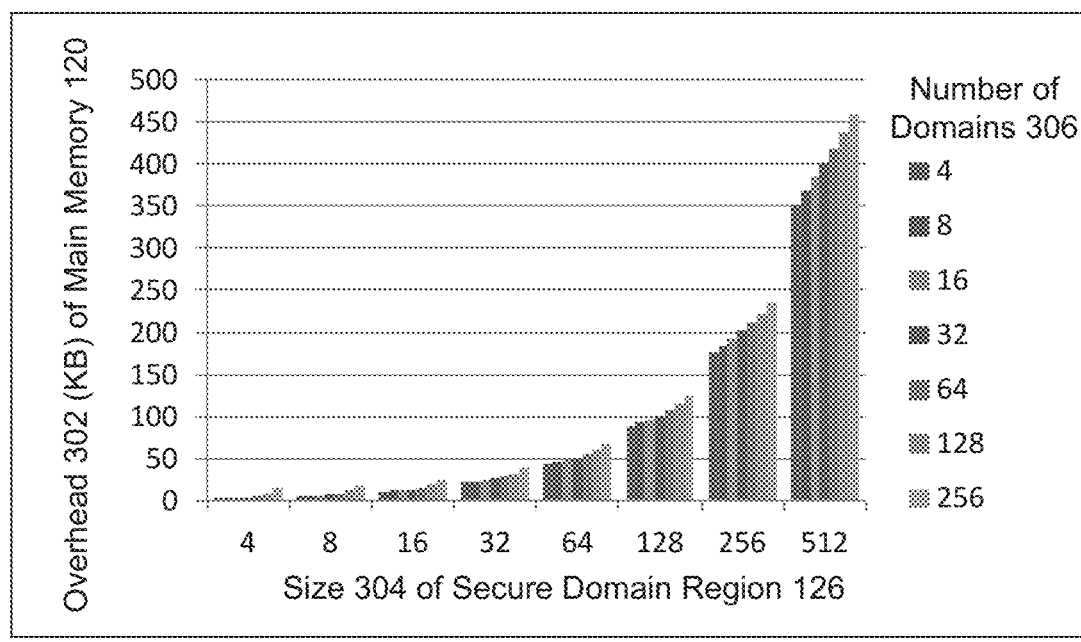
FIG. 3A is a bar graph illustrating overhead of main memory and size of secure domain region by number of domains, according to one embodiment.

FIG. 3A is a bar graph 300 illustrating overhead 302 (KB) of main memory 120 and size 304 (MB) of secure domain region 126 by number of domains 306, according to one embodiment. The overhead 302 of main memory 120 may increase linearly with the size 304 of the secure domain region 126 (e.g, 4 MB, 8 MB, 16 MB, 32 MB, 64 MB, 128 MB, 256 MB, 512 MB, and so forth). For example, a size 304 of 4 MB and number of domains 306 of 64 may have 9 KB of overhead 302. In another example, a size 304 of 512 MB and domains 306 of 64 domains may have 420 KB of overhead 302.

Figure 3B:
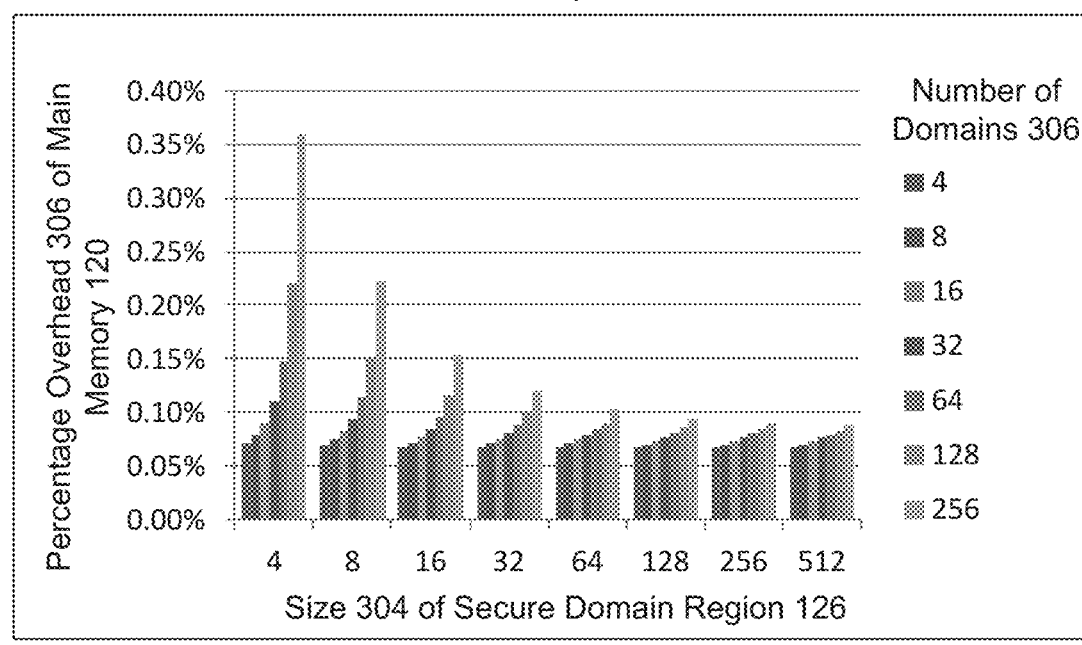
FIG. 3B is a bar graph 350 illustrating percentage overhead of main memory and size of secure domain region by number of domains, according to one embodiment.

FIG. 3B is a bar graph 350 illustrating percentage overhead 308 of main memory 120 and size 304 (MB) of secure domain region 126 by number of domains 306, according to one embodiment. The percentage overhead 308 of main memory 120 may increase linearly with the number of domains 306 supported (e.g., 4 domains, 8 domains, 16 domains, 32 domains, 64 domains, 128 domains, 256 domains, and so forth).

Figure 4:
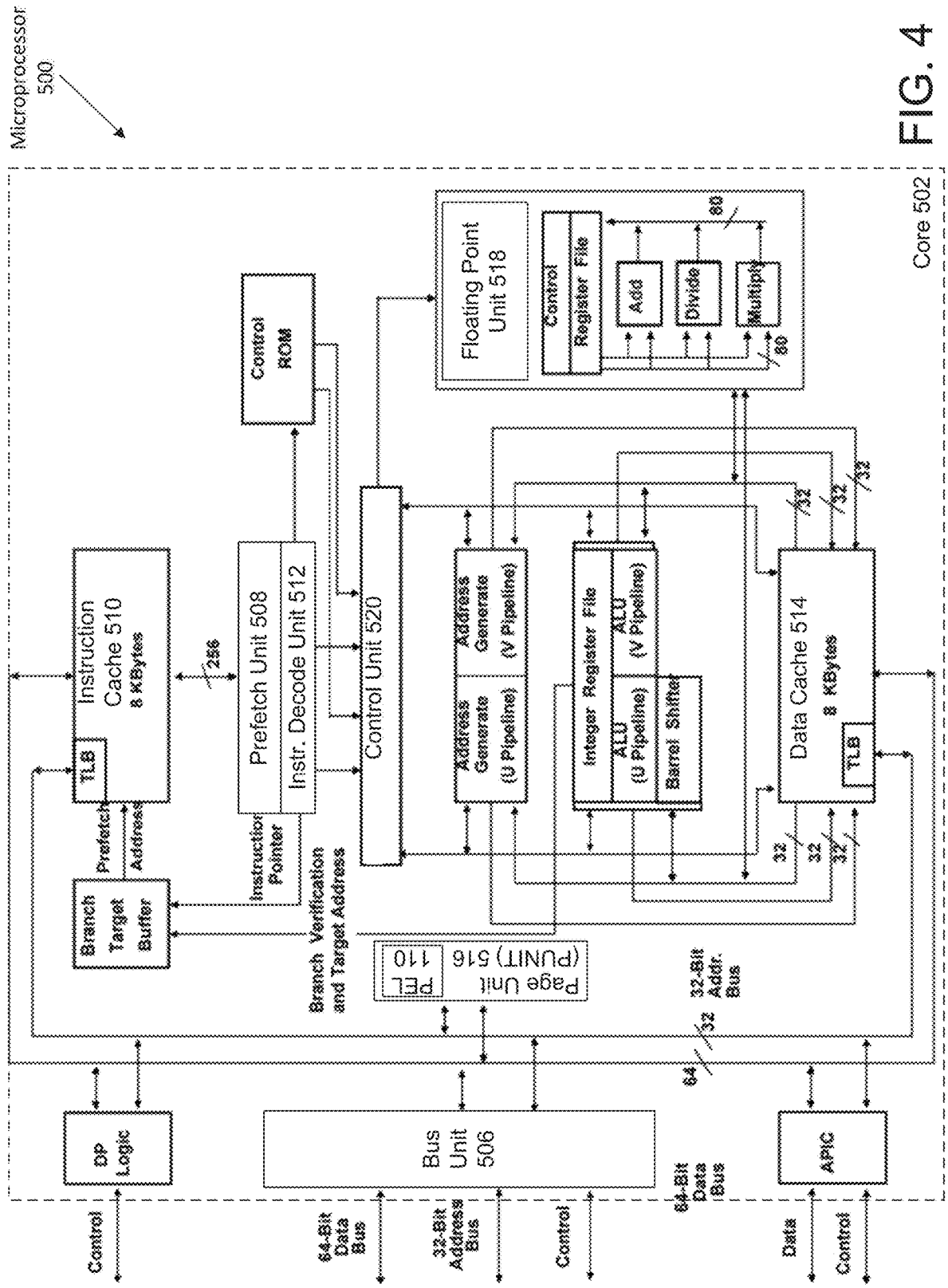
FIG. 4 illustrates a core of a microprocessor including a page unit (PUNIT) with PEL, according to one embodiment.

FIG. 4 illustrates a core 502 of a microprocessor 500 including a page unit (PUNIT) 516 with PEL 110, according to one embodiment.

In on embodiment, the microprocessor 500 is an aggregator. In another embodiment, the microprocessor 500 is a microcontroller. In another embodiment, the microprocessor does not support virtualization. In another embodiment, the microprocessor has a single core. In another embodiment, the core 502 includes a five stage pipeline. In another embodiment, the core 502 has no more than five stages.

In one embodiment, the microprocessor 500 is a memory management unit (MMU)-based processor core with access control logic. In another embodiment, the access control logic is PEL 110. In one embodiment, the PEL performs single threaded execution by a single hardware thread. In another embodiment, the PEL performs direct mapping in access control for simple lookup. In another embodiment, the PEL restricts mapping to a region of DRAM and restricts total number of secure domains, wherein the secure domains can be cached within a translation lookaside buffer (TLB) (e.g., TLB 522 of FIG. 5B). In one embodiment, the microprocessor includes the lightweight secure architecture 100.

In one embodiment, the microprocessor 500 is a processor including a core 502 including a single thread of execution. The core 502 includes a bus unit 506 to couple to a main memory 120, a prefetch unit 508 coupled to the bus unit 506, and a page unit 516 coupled to the prefetch unit 508.

The page unit 516 includes policy enforcement logic (PEL) 110. The page unit 516 is to partition the main memory 120 into an unprotected region 122 including a plurality of unsecure domains, a secure domain region 126 including a plurality of secure domains, and a reserved region 130 including a secure domain cache (SDC) 140 and SDM. The page unit 516 restricts access to the plurality of secure domains by applications 702 executing by the core 502 to provide hardware-based, trusted execution of the applications 702. In response to a memory request at the page unit 516 from an application 702 executing in a current domain 180, the page unit is to map a current virtual address (VA) 172 to a current physical address (PA) 174 using a page table 170. In one embodiment, the current domain is express in the memory request. In another embodiment, the current domain from the source of the memory request.

The PEL 110 is to read, from the SDC 140, a domain value (DID) (e.g., from DT 144) and a VA value (e.g., from VA 146) that correspond to the current PA 174. In one embodiment, the VA value and DID are indexed according to the current PA 174 stored in the page table 170.

The PEL 110 is to grant access when the current domain 180 and the DID correspond to the unprotected region 122. The PEL 110 is to grant access when the current domain 180 and the DID correspond to the secure domain region 126, the current domain 180 is equal to the DID, and the current VA 172 is equal to the VA value. The PEL 110 is to grant data access and deny code access when the current domain 180 corresponds to the secure domain region 126 and the DID corresponds to the unprotected region 122.

The core 502 may include one or more of a bus unit 506, prefetch unit 508 (e.g., prefetch buffer), instruction cache 510 (e.g., code cache), instruction decode unit 512, data cache 514, page unit (PUNIT) 516, and floating point unit 518 (e.g., floating point unit). The PUNIT 516 includes PEL 110 of lightweight secure architecture 100 as shown in FIGS. 5A-5C.

Figure 5B:
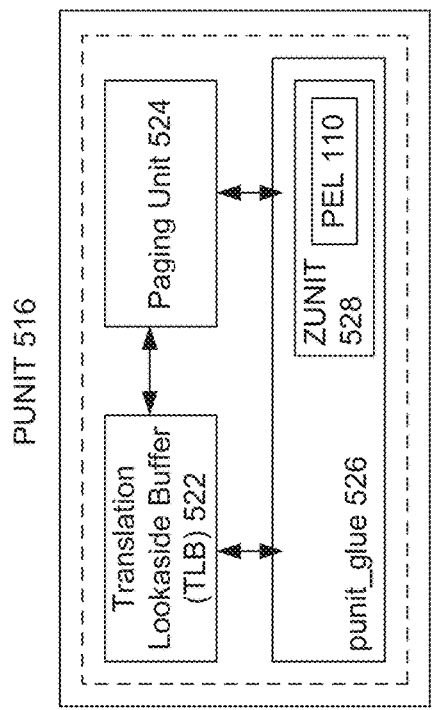
FIG. 5B illustrates the PUNIT including a ZUNIT with PEL, according to one embodiment.
Figure 5C:
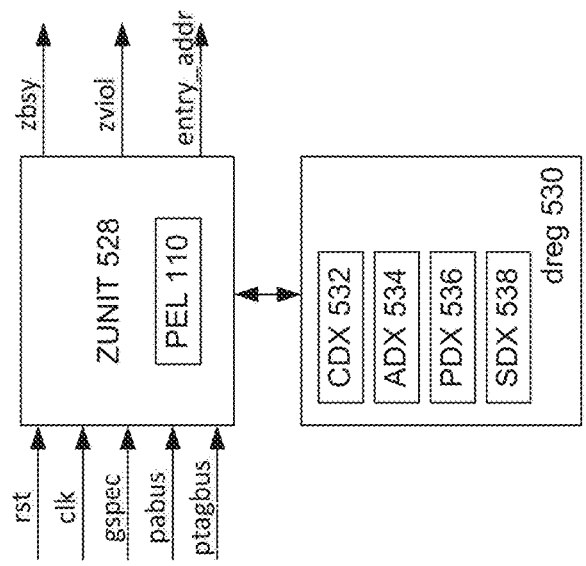
FIG. 5C illustrates the ZUNIT including PEL, according to one embodiment.
Figure 5A:
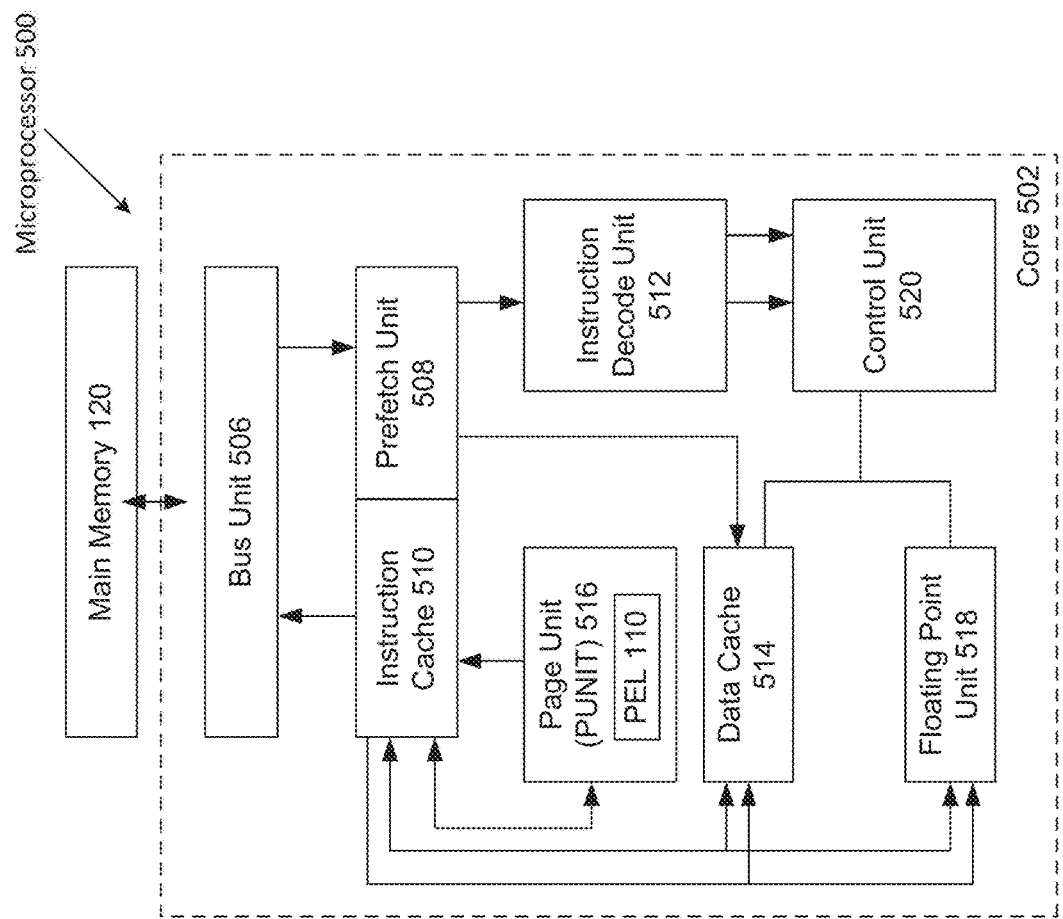
FIG. 5A illustrates the core of the microprocessor including a PUNIT with PEL, according to another embodiment.

FIG. 5A illustrates the core 502 of the microprocessor 500 including a PUNIT 516 with PEL 110, according to another embodiment. Main memory 120 may communicate (e.g., send signals, send data, send instructions, receive signals, receive data, receive instructions, and so forth) with core 502. Core 502 may include one or more of bus unit 506, prefetch unit 508, instruction cache 510, instruction decode unit 512, data cache 514, PUNIT 516, floating point unit 518, and control unit 520. Memory 120 may communicate with bus unit 506. Bus unit 506 may transmit communication to prefetch unit 508 and bus unit 506 may receive communication from instruction cache 510. Prefetch unit 508 may transmit communication to instruction decode unit 512 and data cache 514. Instruction cache 510 may be coupled to PUNIT 516, data cache 514, and floating point unit 518. PUNIT 516 may transmit communication to instruction cache 510 as a point of first physical address access. Instruction decode unit 512 may transmit communication to control unit 520 and control unit 520 may be coupled to data cache 514 and floating point unit 518.

FIG. 5B illustrates the PUNIT 516 including a ZUNIT 528 with PEL 110, according to one embodiment. The ZUNIT 516 is a standalone unit and is power gated when access control is not required. The PUNIT 516 may include translation lookaside buffer (TLB) 522, paging unit 524, and punt_glue 526. The punt_glue 526 may include ZUNIT 528. The PUNIT 516 may include pbsy logic and pviol logic.

FIG. 5C illustrates the ZUNIT 528 including PEL 110, according to one embodiment. The ZUNIT 528 may receive a plurality of signals (e.g., rst, clk, gspec, pabus, ptagbus, and so forth) and may transmit a plurality of signals (e.g., zbsy, zviol, entry addr, and so forth). The zbsy and zviol may be fed into the pbsy and pviol logic in the PUNIT 516. ZUNIT 528 may communicate with dreg 530 (e.g., a module within the DUNIT). Dreg 530 may include registers including one or more of CDX 532, ADX 534, PDX 536, and SDX 538.

Figure 6:
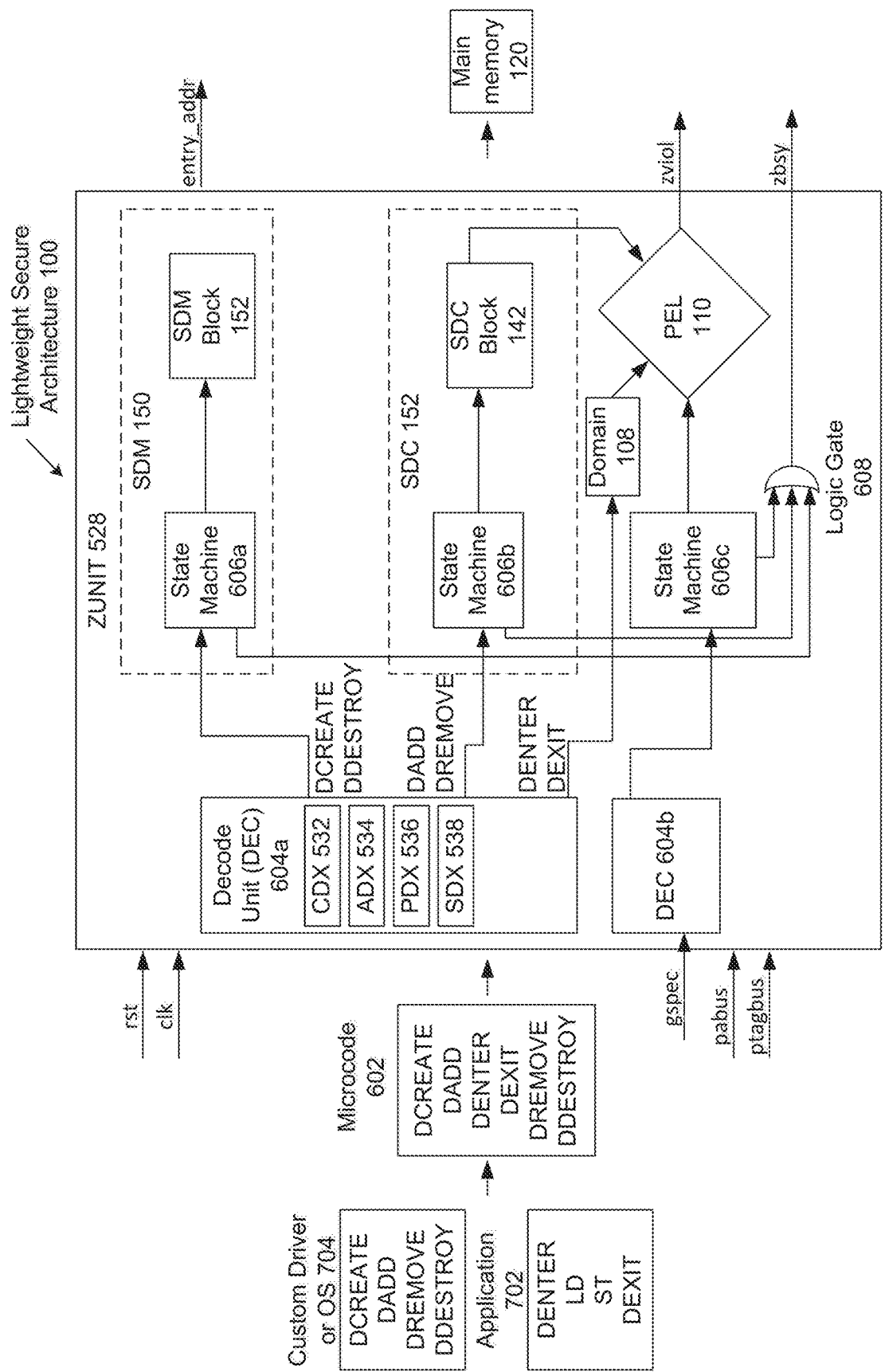
FIG. 6 illustrates the architecture flow of the lightweight secure architecture, according to one embodiment.

FIG. 6 illustrates the architecture flow 600 of the lightweight secure architecture 100, according to one embodiment. Custom driver or OS 704 may call instructions such as DCREATE, DADD, DREMOVE, DDESTROY, and so forth. Application 702 may call instructions such as DENTER, LD (load), ST (store), DEXIT, DRESUME, and so forth. Flow continues from at least one of the custom driver or OS 704 or application 702 to microcode 602.

Microcode 602 may include one or more instructions such as DCREATE, DADD, DENTER, DEXIT, DREMOVE, DDESTROY, and so forth. In one embodiment, 102 lines of microcode 602 are added.

Flow continues from the microcode 602 to ZUNIT 528. The instructions may be used to manage or access the SDC 140 and SDM 150. The instructions may assume secure pages are pinned so there is no swapping out.

ZUNIT 528 may receive a DCREATE instruction to create a new secure domain and search the SDM 150 for an empty slot. In response to finding the empty slot, ZUNIT 528 may fill the empty slot with related information (e.g., a base VA) to create the new secure domain. In response to not finding an empty slot, the ZUNIT 528 may return an error. In one embodiment, the instruction latency of the DCREATE instruction is 18 cycles. DCREATE depends on the total number of SDs supported (e.g., 16).

ZUNIT 528 may receive a DADD instruction to add a page to a first secure domain and tag a physical page corresponding to the first secure domain with a DT 144. The ZUNIT 528 may store the DT 144 in the SDC 140 and add, to the SDC 140, a first VA 146 value of the page, where the physical page is mapped to the first VA 146 value in a page table 170 of the page (e.g., PA corresponding to DT 144 is the same as current PA 174 of page table 170). In one embodiment, the instruction latency of the DADD instruction is 2 cycles.

The ZUNIT 528 may receive a DENTER instruction to enter a first secure domain from a first current domain, where the first current domain is an unsecure domain. The ZUNIT 528 may find the SDM 150, start executing from a base VA, save a next enhanced instruction pointer (EIP) and other context before switching to the first secure domain, set the first current domain to the first secure domain, and enter the first secure domain. In one embodiment, the instruction latency of the DENTER instruction is 12 cycles.

The ZUNIT 528 may receive a DEXIT instruction to exit a first secure domain, exit from the first secure domain to an unsecure domain, and signal an end of execution of the first secure domain. In one embodiment, the instruction latency of the DEXIT instruction is 9 cycles.

The ZUNIT 528 may receive a DREMOVE instruction to remove a page from a first secure domain, and update an entry in the SDC 140 corresponding to the page removed from first secure domain, where the entry is to be used by other secure domains in response to the ZUNIT 528 updating the entry. In one embodiment, the instruction latency of the DREMOVE is 2 cycles.

The ZUNIT 528 may receive a DDESTROY instruction to remove a first secure domain, and update an entry in SDM 150 corresponding to the first secure domain, where the entry is to be reused in response to the ZUNIT 528 updating the entry. In one embodiment, the instruction latency of the DDESTROY instruction is 2 cycles. In one embodiment, SDC 140 and SDM 150 are implemented as register arrays. In another embodiment, SDC 140 and SDM 150 are stored in the main memory 120 and the latency depends on memory read/write latency.

The instruction DRESUME has the function of resuming to the previous saved state after exception.

ZUNIT 528 includes decode (DEC) 604a and DEC 604c, state machine 606c, domain 108, and PEL 110. ZUNIT 528 is coupled to SDM 150 and SDC 140 of main memory 120. DEC 604a includes one or more registers such as CDX 532, ADX 534, PDX 536, and SDX 538. In one embodiment, SDM 150 includes state machine 606a and SDM block 152 and SDC 140 includes state machine 606b and SDC block 142. In another embodiment, ZUNIT 528 includes state machines 606a, 606b, and 606b and SDM 150 is coupled to state machine 606a and SDC 140 is coupled to state machine 606b.

DEC 602a receives one or more instructions from microcode 602. When the instruction is DCREATE or DDESTROY, DEC 604a transmits the instruction to state machine 606a of SDM 150. State machine 606a processes the instruction and communicates with SDM block 152 and logic gate 608. SDM 150 outputs an entry address. When the instruction is DADD or DREMOVE, DEC 604a transmits the instruction to the state machine 606b of SDC 140. State machine 606b processes the instruction and communicates with logic gate 608 and SDC block 142. SDC block 142 communicates with PEL 110. When the instruction is DENTER or DEXIT, DEC 604a transmits the instruction to domain 108 and domain 108 communicates with PEL 110. Domain 108 keeps track of the current domain.

ZUNIT 528 receives one or more signals including rst, clk, gspec, pabus, ptagbus, and so forth. ZUNIT 528 receives the signal gspec at DEC 604b. DEC 604b communicates with state machine 606c. State machine 606c communicates with PEL 110 and logic gate 608. Logic gate receives communication from one or more of state machine 606a, 606b, or 606c (hereinafter state machine 606). Logic gate 608 outputs zbsy and ZUNIT 528 feeds zbsy into the pbsy logic of the PUNIT 516.

PEL 110 receives communication from one or more of domain 108, SDC block 142, and state machine 606c. PEL 110 outputs zviol and ZUNIT 528 feeds zviol into the pviol logic in PUNIT 516. In one embodiment, when there is a violation, zviol is triggered (e.g., PEL 110 outputs zviol). Zviol may have 2 cycles. In another embodiment, PEL 110 does not output anything when there is not a violation. In another embodiment no violation has two cycles and violation (e.g., zviol is triggered) has two cycles.

Figure 7A:
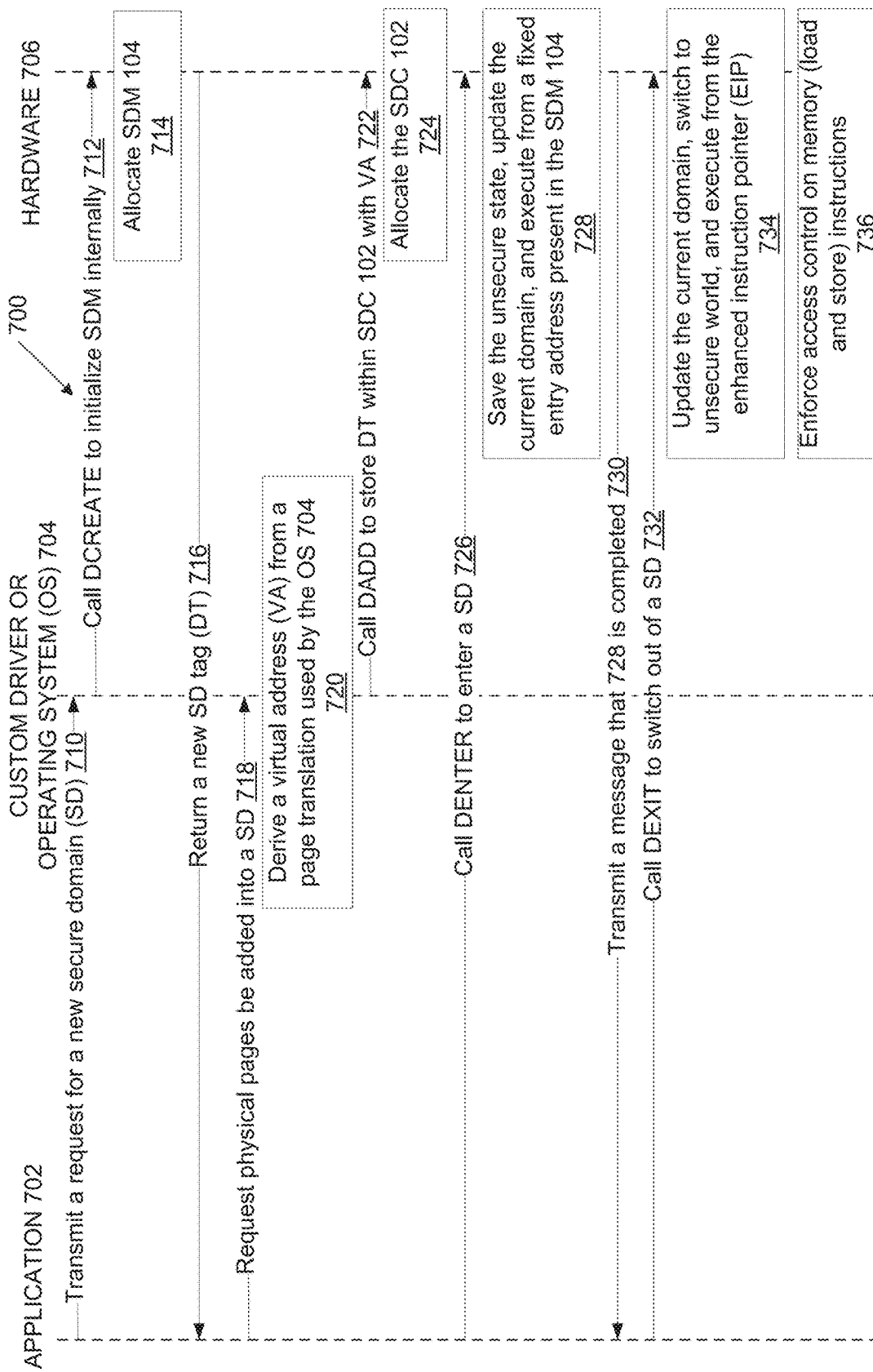
FIG. 7A is a sequence diagram illustrating methods of processing DCREATE, DADD, DENTER, and DEXIT instructions via the lightweight secure architecture, according to one embodiment.

FIG. 7A is a sequence diagram illustrating methods of processing DCREATE, DADD, DENTER, and DEXIT instructions via the lightweight secure architecture 100, according to one embodiment.

Sequences 710 to 716 illustrate the DCREATE instruction, according to one embodiment. At 710, application 702 transmits a request for a new SD to the custom driver or operating system (OS) 704. At 712, custom driver or OS 704 calls the DCREATE instruction to initialize SDM 150 internally.

At 714, hardware 706 allocates SDM 150. In one embodiment, hardware searches the SDM for an empty slot. In response to finding the empty slot, the hardware fills the empty slot with a base VA to create the new secure domain. In response to not finding an empty slot, hardware returns an error. At 716, hardware 706 returns the new secure domain tag (DT) to application 702.

Sequences 718 to 724 illustrate the DADD instruction, according to one embodiment. At 718, application 702 requests physical pages be added into a SD. At 720, custom driver or OS 704 derives a virtual address (VA) from a page translation used by the OS 704. At 722, custom driver or OS 704 calls the DADD instruction to store the DT within the SDC 140 along with the VA derived from the page translation used by the OS 704.

At 724, hardware 706 allocates the SDC 140. In one embodiment, hardware tags a physical page corresponding to the first secure domain with a secure domain tag (DT), stores the DT in the SDC 140, and adds, to the SDC 140, a first VA value of the page, where the physical page is mapped to the first VA value in a page table of the page.

Sequences 726 to 730 illustrate the DENTER instruction, according to one embodiment. At 726, application 702 calls the DENTER instruction to enter a SD. In one embodiment, the DENTER instruction is to enter a SD from an unsecure current domain. At 728, hardware 706 saves the unsecure state, updates the current domain, and executes from a fixed entry address present in SDM 150. In one embodiment, hardware 706 finds the SDM 150, starts executing from a base VA, saves a next enhanced instruction pointer (EIP) and other context before switching to the SD, sets the current domain to the SD, and enters the SD.

At 730, hardware 706 transmits a message to application 702 that 728 is completed. Sequences 732 to 736 illustrate the DEXIT instruction, according to one embodiment. At 732, application 702 calls the DEXIT instruction to switch out of a SD. At 734, hardware 706 updates the current domain, switches to unsecure world, and executes from the saved EIP. In one embodiment, hardware exits from the first secure domain to an unsecure domain and signals an end of execution of the first secure domain. In another embodiment, at 736, hardware 706 enforces access control on memory (e.g., load and store) instructions.

Figure 7B:
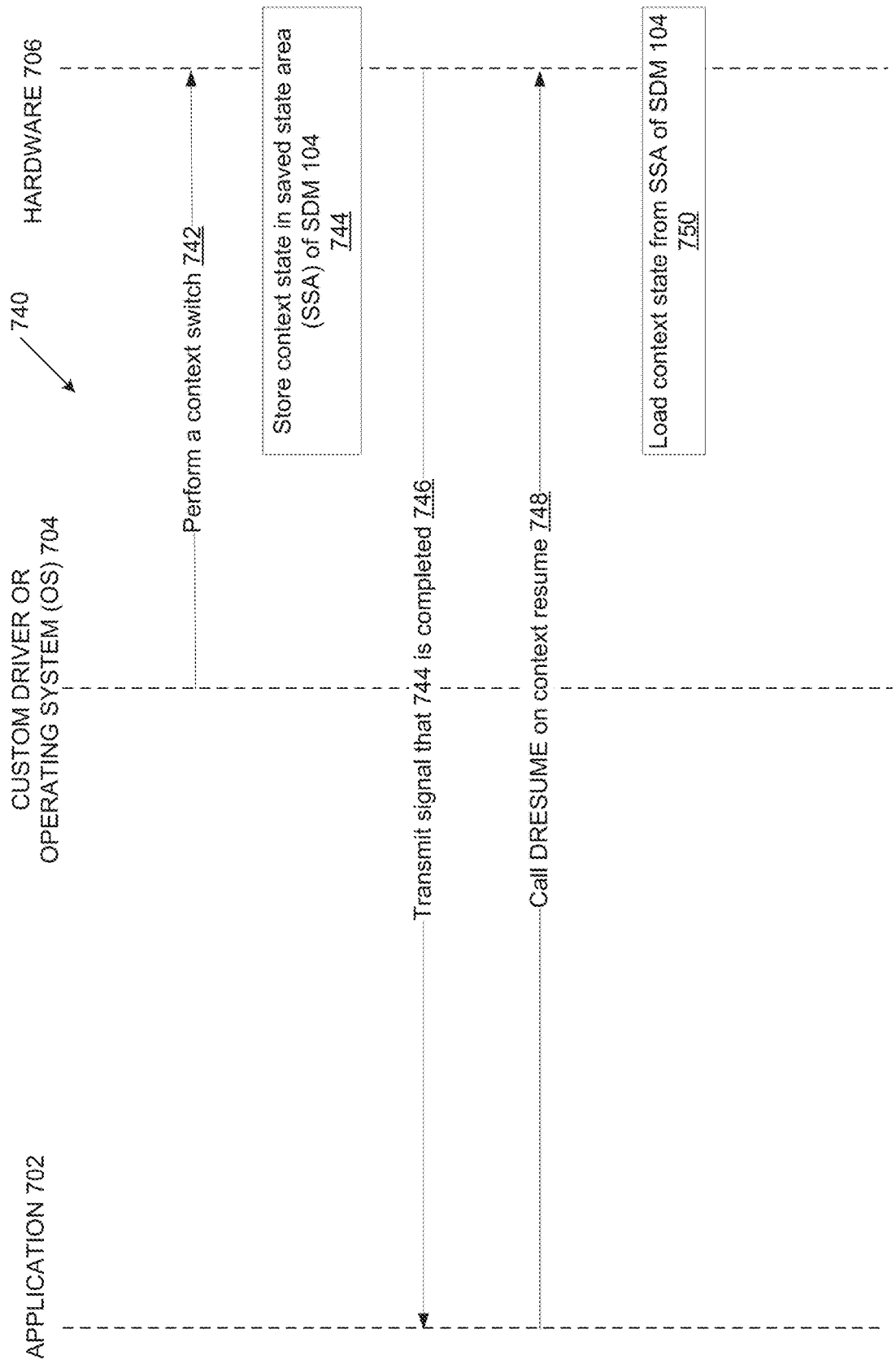
FIG. 7B is a sequence diagram illustrating a method of processing a DRESUME instruction via the lightweight secure architecture, according to one embodiment.

FIG. 7B is a sequence diagram 740 illustrating a method of processing a DRESUME instruction via the lightweight secure architecture 100, according to one embodiment.

At 742, custom driver or OS 704 performs a context switch. At 744, hardware 706 stores context state in saved state area (SSA) (e.g., saved state 158) of SDM 150. At 746, hardware 706 transmits a message that 744 is completed. At 748, application 702 calls the DRESUME instruction on context resume. At 750, hardware 706 loads context state from the SSA of the SDM 150.

Figure 7C:
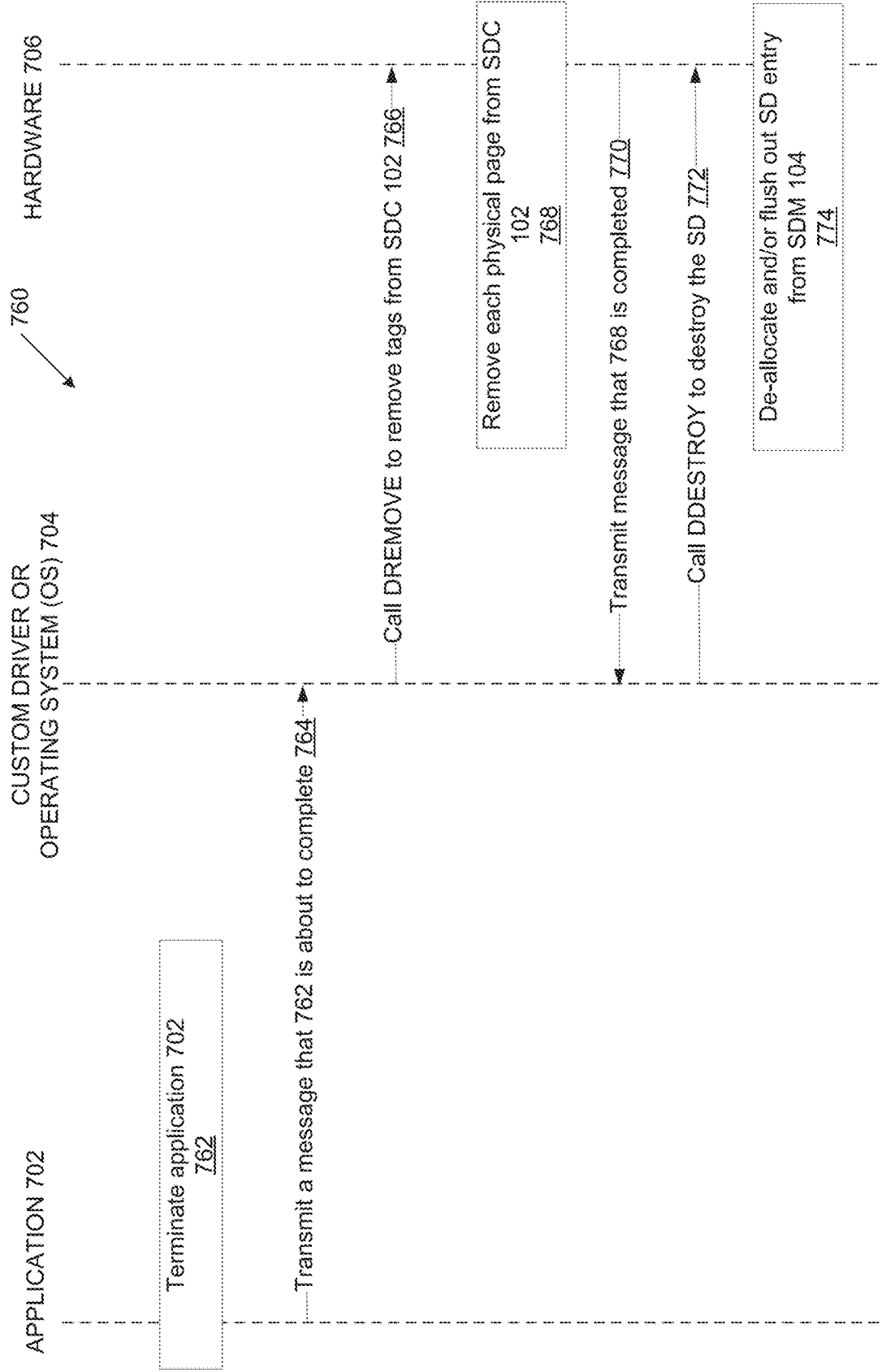
FIG. 7C is a sequence diagram illustrating a method of processing the DREMOVE and DDESTROY instructions via the lightweight secure architecture, according to another embodiment.

FIG. 7C is a sequence diagram 760 illustrating a method of processing the DREMOVE and DDESTROY instructions via the lightweight secure architecture 100, according to another embodiment.

Sequences 762 to 770 illustrate the DREMOVE instruction, according to one embodiment. At 762, application 702 terminates. At 764, application 702 transmits a message that 762 is about to complete. In another embodiment, at 764, application 702 transmits a message that 762 has completed. In another embodiment, at 764, application 702 transmits a message of when 762 will complete. At 766, custom driver or OS 704 calls the DREMOVE instruction to remove tags from SDC 140. At 768, hardware 706 removes each physical page from SDC 140. In one embodiment, hardware 706 removes the page from the first secure domain and updates an entry in the SDC 140 corresponding to the page removed from first secure domain, where the entry is to be used by other secure domains in response to the hardware 706 updating the entry.

At 770, hardware transmits a message that 768 is completed. Sequences 772 to 774 illustrate the DDESTROY instruction, according to one embodiment. At 772, custom driver or OS 704 calls the DDESTROY instruction to destroy the SD. At 774, hardware 706 de-allocates and/or flushes out the SD entry from SDM 150. In one embodiment, hardware 706 removes the first secure domain and updates an entry in SDM 150 corresponding to the first secure domain, where the entry is to be reused in response to the hardware 706 updating the entry FIG. 8A illustrates the DADD instruction as processed by the lightweight secure architecture 100, according to one embodiment. The hardware 706 receives a DADD instruction to add a page to a first secure domain, tags a physical page corresponding to the first secure domain with a DT 144, stores the DT 144 in the SDC 140, and adds, to the SDC 140, a first VA value 146 of the page, wherein the physical page (e.g., PA) is mapped to the first VA value in a page table 170a of the page (e.g., current PA 174a). For example, page table 170a of current domain 180a contains three entries for current VA 172a and three corresponding entries for current PA 174a. The hardware 706 receives the DADD instruction corresponding to current domain 180a of 1, current VA 172a of V1, and current PA 174a of P1. The hardware 706 then tags PA 1 with a secure domain tag value (DID) of 1, stores the DID of 1 in DT 144 of SDC 140 that corresponds to the PA of 1, and adds VA of V1 to the corresponding VA 146.

FIG. 8B illustrates the DREMOVE instruction as processed by the lightweight secure architecture 100, according to one embodiment. The hardware 706 receives a DREMOVE instruction to remove a page from a first secure domain, removes the page from the first secure domain, and updates an entry in the SDC 140 corresponding to the page removed from first secure domain, wherein the entry is to be used by other secure domains in response to the hardware 706 updating the entry. For example, hardware 706 receives a DREMOVE instruction to remove PA of 1 from domain 180a of 1, removes the PA of 1 from domain 180a of 1, removes the values from DT 144 and VA 146 corresponding to the PA of 1, and the entry corresponding to PA of 1 is to be used by other secure domains.

FIG. 8C illustrates the DENTER instruction as processed by the lightweight secure architecture 100, according to one embodiment. The hardware receives a DENTER instruction to enter a first secure domain from a current domain 180, where the current domain 180 is an unsecure domain, finds the SDM 150, starts executing from a base VA 172, saves a next enhanced instruction pointer (EIP) and other context before switching to the first secure domain, sets the first current domain to the first secure domain, and enters the first secure domain. For example, hardware 706 receive a DENTER instruction, finds SDM 150, starts executing from a base VA 172, saves an EIP of 0x00005000 to entry address 156 and value of 1 to valid 154 in SDM 150, sets the current domain 180 to the secure domain, and enters the secure domain.

FIG. 8D illustrates the DEXIT instruction as processed by the lightweight secure architecture 100, according to one embodiment. The hardware 706 receives a DEXIT instruction to exit a first secure domain, exits from the first secure domain to an unsecure domain, and signals an end of execution of the first secure domain. For example, hardware 706 receives a DEXIT instruction to exit from domain 1, exits from domain 1 to an unsecure domain (e.g., set EIP to the same value as the SDX of 0x000FF000), and signals end of execution of the first domain (e.g., a DID of a value of zero).

FIG. 8E illustrates the DCREATE instruction as processed by the lightweight secure architecture 100, according to one embodiment. The hardware 706 receives a DCREATE instruction to create a new secure domain, searches the SDM 150 for an empty slot. In response to finding the empty slot, the hardware 706 fills the empty slot with a base VA to create the new secure domain. In response to not finding an empty slot, the hardware 706 returns an error. For example, hardware receives a DECREATE instruction, searches SDM 150 for an empty slot, finds an empty slot at domain 1, and fills the empty slot (e.g., base VA, entry address 156, and so forth) to create the new secure domain.

FIG. 8F illustrates the DDESTROY instruction as processed by the lightweight secure architecture 100, according to one embodiment. The hardware 706 receives a DDE-STROY instruction to remove a first secure domain, removes the first secure domain, and updates an entry in SDM 150 corresponding to the first secure domain, where the entry is to be reused in response to the hardware 706 updating the entry. For example, hardware 706 starts with an SDM 150 with values for domain 1 as shown in FIG. 8E, receives a DDESTROY instruction, removes the secure domain, updates the entry in SDM 150 for domain 1 to reflect the values shown in FIG. 8F (e.g., updates valid 154 to a value of zero, removes the value from entry address 156, removes the value from saved state 158, and so forth), and domain 1 is to be reused in response to being updated.

Figure 9:
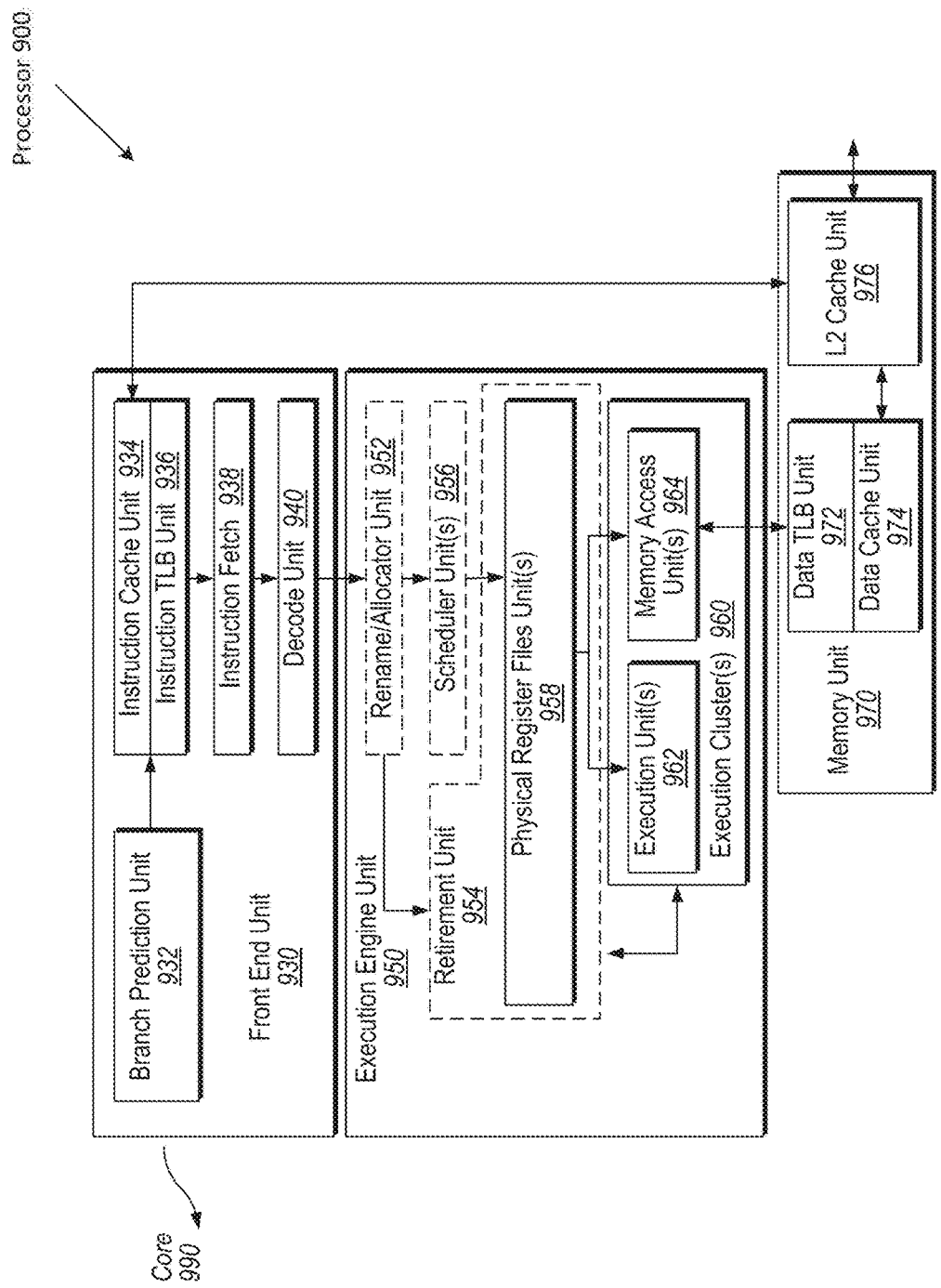
FIG. 9 is a block diagram illustrating a micro-architecture for a processor that implements lightweight secure architecture including PEL, according to one embodiment.

FIG. 9 is a block diagram illustrating a micro-architecture for a processor 900 that implements lightweight secure architecture 100 including PEL 110 according to one embodiment. Specifically, processor 900 depicts an in-order architecture core and a register renaming logic, out-of-order issue/execution logic to be included in a processor according to at least one embodiment of the disclosure. The embodiments of the lightweight secure architecture 100 with PEL 110 can be implemented in processor 900. In one embodiment, processor 900 is the microprocessor 500 of FIG. 4.

Processor 900 includes a front end unit 930 coupled to an execution engine unit 950, and both are coupled to a memory unit 970. The processor 900 may include a core 990 that is a reduced instruction set computing (RISC) core, a complex instruction set computing (CISC) core, a very long instruction word (VLIW) core, or a hybrid or alternative core type. As yet another option, processor 900 may include a special-purpose core, such as, for example, a network or communication core, compression engine, graphics core, or the like. In another embodiment, the core 990 may have five stages.

The front end unit 930 includes a branch prediction unit 932 coupled to an instruction cache unit 934 (e.g., instruction cache 510), which is coupled to an instruction translation lookaside buffer (TLB) unit 936, which is coupled to an instruction fetch unit 938 (e.g., prefetch unit 508), which is coupled to a decode unit 940 (e.g., instruction decode unit 512). The decode unit 940 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations (RS), central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 is overlapped by the retirement unit 954 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which may include a data prefetcher, a data TLB unit 972, a data cache unit (DCU) 974, and a level 2 (L2) cache unit 976, to name a few examples. In some embodiments DCU 974 is also known as a first level data cache (L1 cache). The DCU 974 may handle multiple outstanding cache misses and continue to service incoming stores and loads. It also supports maintaining cache coherency. The data TLB unit 972 is a cache used to improve virtual address translation speed by mapping virtual and physical address spaces. In one exemplary embodiment, the memory access units 964 may include a load unit, a store address unit, and a store data unit, each of which is coupled to the data TLB unit 972 in the memory unit 970. The L2 cache unit 976 may be coupled to one or more other levels of cache and eventually to a main memory.

In one embodiment, the data prefetcher speculatively loads/prefetches data to the DCU 974 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 900 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
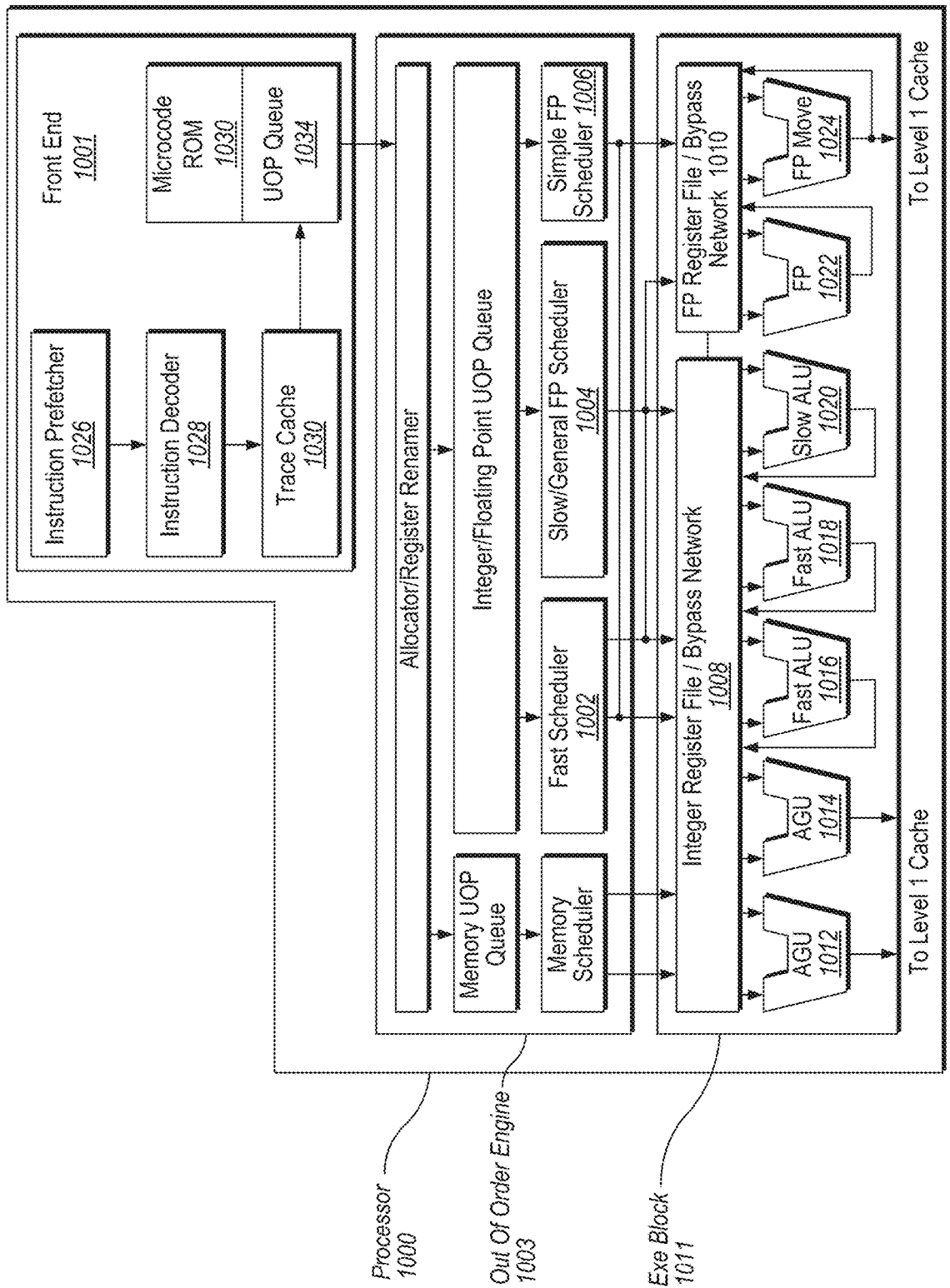
FIG. 10 illustrates a block diagram of the micro-architecture for a processor that includes logic circuits to perform access control, according to one embodiment.

FIG. 10 illustrates a block diagram of the micro-architecture for a processor 1000 that includes logic circuits (e.g., PEL 110) to perform access control according to one embodiment. In one embodiment, processor 1000 is the microprocessor 500 of FIG. 4.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1001 is the part of the processor 1000 that fetches instructions to be executed and prepares them to be used later in the processor pipeline. The embodiments of the lightweight secure architecture 100 with PEL 110 can be implemented in processor 1000.

The front end 1001 may include several units. In one embodiment, the instruction prefetcher 1016 (e.g., prefetch unit 508) fetches instructions from memory and feeds them to an instruction decoder 1018 (e.g., instruction decode unite 512) which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded uops and assembles them into program ordered sequences or traces in the uop queue 1034 for execution. When the trace cache 1030 encounters a complex instruction, the microcode ROM 1032 provides the uops needed to complete the operation.

Some instructions are converted into a single micro-op, whereas others need several micro-ops to complete the full operation. In one embodiment, if more than four micro-ops are needed to complete an instruction, the decoder 1018 accesses the microcode ROM 1032 to do the instruction. For one embodiment, an instruction can be decoded into a small number of micro ops for processing at the instruction decoder 1018. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1000 also includes logic to implement access control according to one embodiment. In one embodiment, the execution block 1011 of processor 1000 may include PEL 110, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 11:
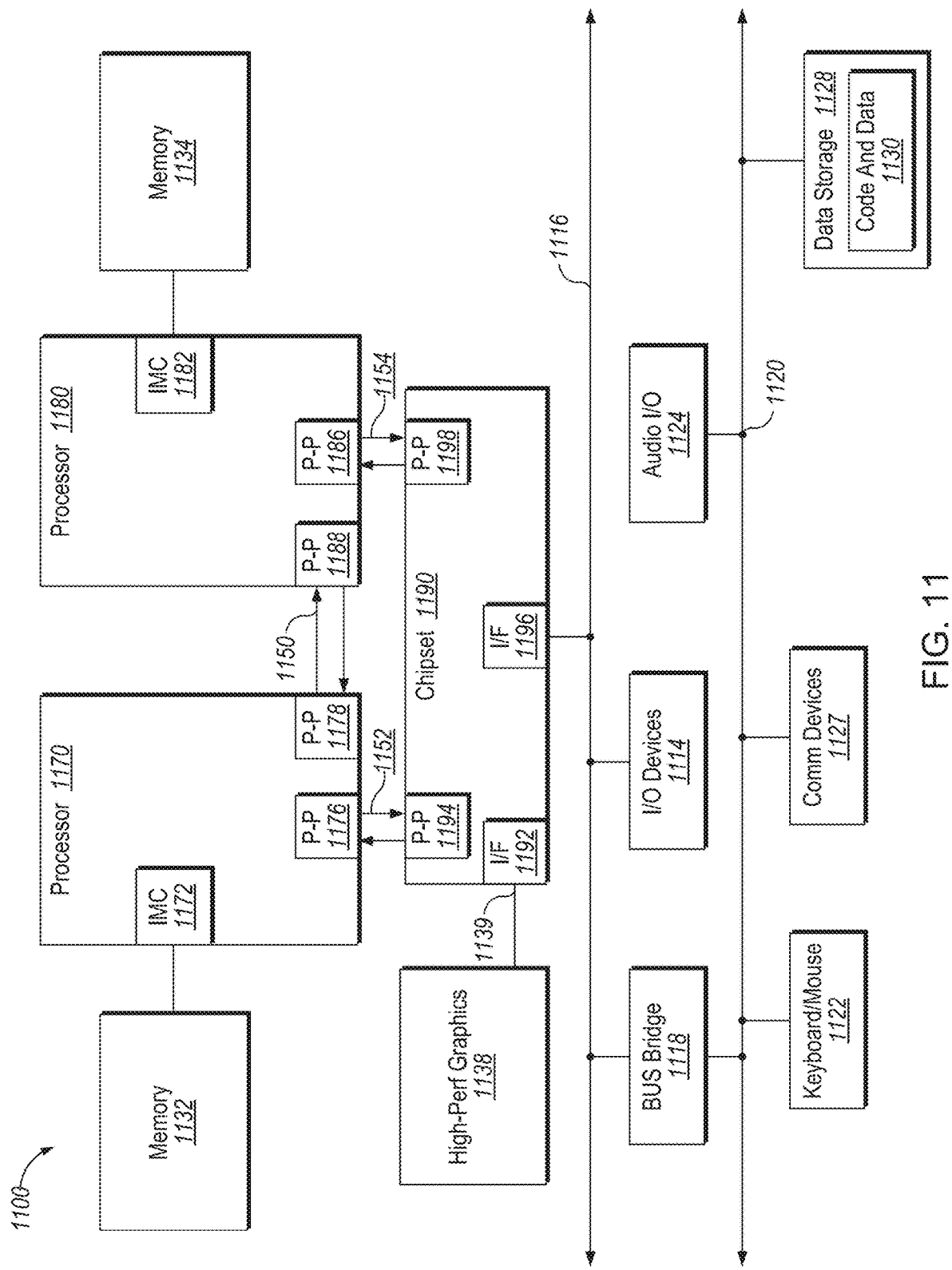
FIG. 11 is a block diagram of a computer system according to one implementation.

Embodiments may be implemented in many different system types. Referring now to FIG. 11, shown is a block diagram of a multiprocessor system 1100 in accordance with an implementation. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174a and 1174b and processor cores 1184a and 1184b), although potentially many more cores may be present in the processors. The processors each may include hybrid write mode logics in accordance with an embodiment of the present. The embodiments of the lightweight secure architecture 100 with PEL 110 can be implemented in the processor 1170, processor 1180, or both.

While shown with two processors 1170, 1180, it is to be understood that the scope of the present disclosure is not so limited. In other implementations, one or more additional processors may be present in a given processor.

Processors 1170 and 1180 are shown including integrated memory controller units 1182 and 1182, respectively. Processor 1170 also includes as part of its bus controller units point-to-point (P-P) interfaces 1176 and 1188; similarly, second processor 1180 includes P-P interfaces 1186 and 1188. Processors 1170, 1180 may exchange information via a point-to-point (P-P) interface 1150 using P-P interface circuits 1188, 1188. As shown in FIG. 11, IMCs 1182 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
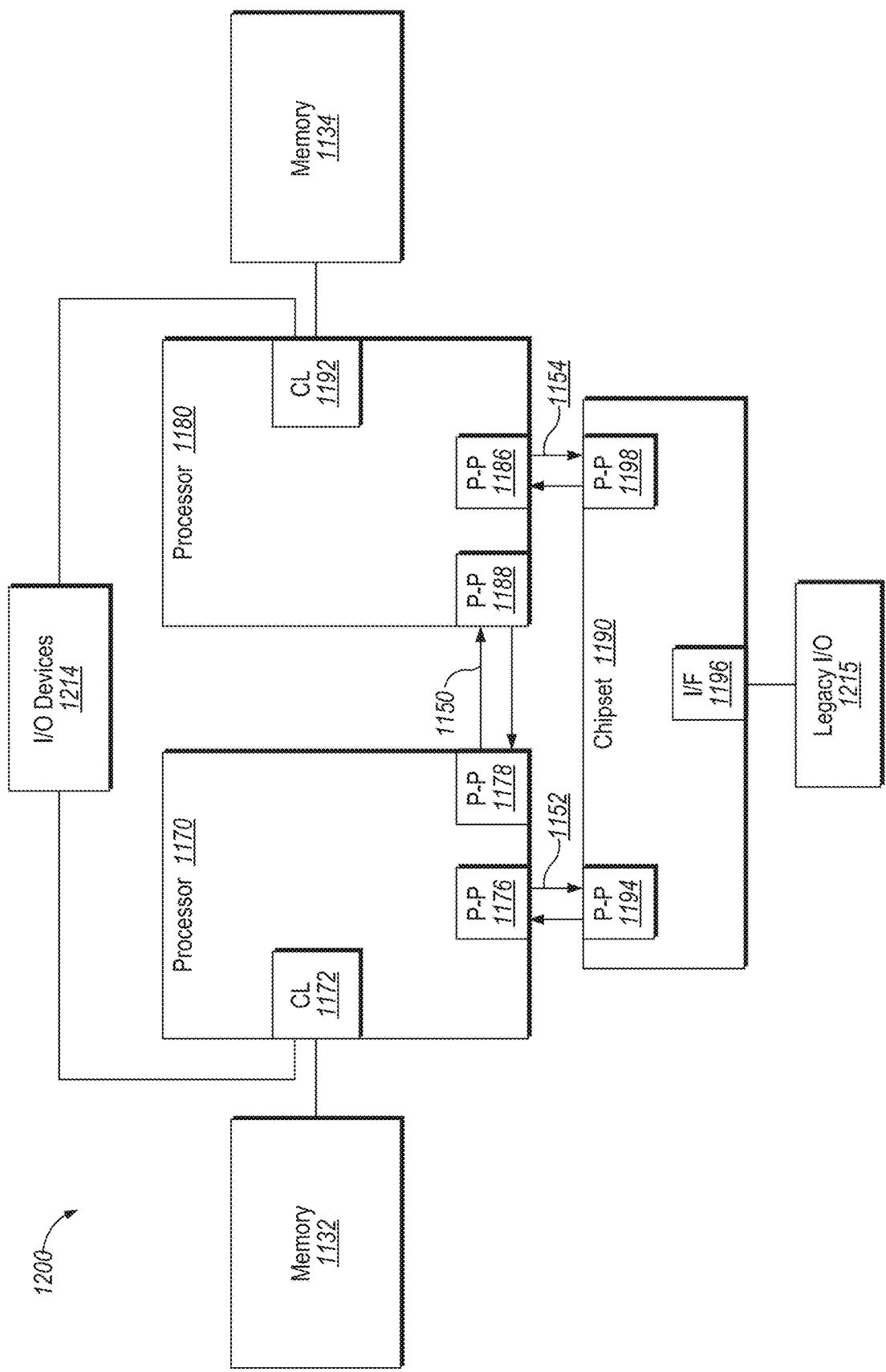
FIG. 12 is a block diagram of a computer system according to another implementation.

Referring now to FIG. 12, shown is a block diagram of a third system 1200 in accordance with an embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. For at least one embodiment, the CL 1172, 1182 may include integrated memory controller units such as described herein. In addition. CL 1172, 1182 may also include I/O control logic. FIG. 12 illustrates that the memories 1132, 1134 are coupled to the CL 1172, 1182, and that I/O devices 1214 are also coupled to the control logic 1172, 1182. Legacy I/O devices 1215 are coupled to the chipset 1190. The embodiments of the lightweight secure architecture 100 with PEL 110 can be implemented in processor 1170, processor 1180, or both.

Figure 13:
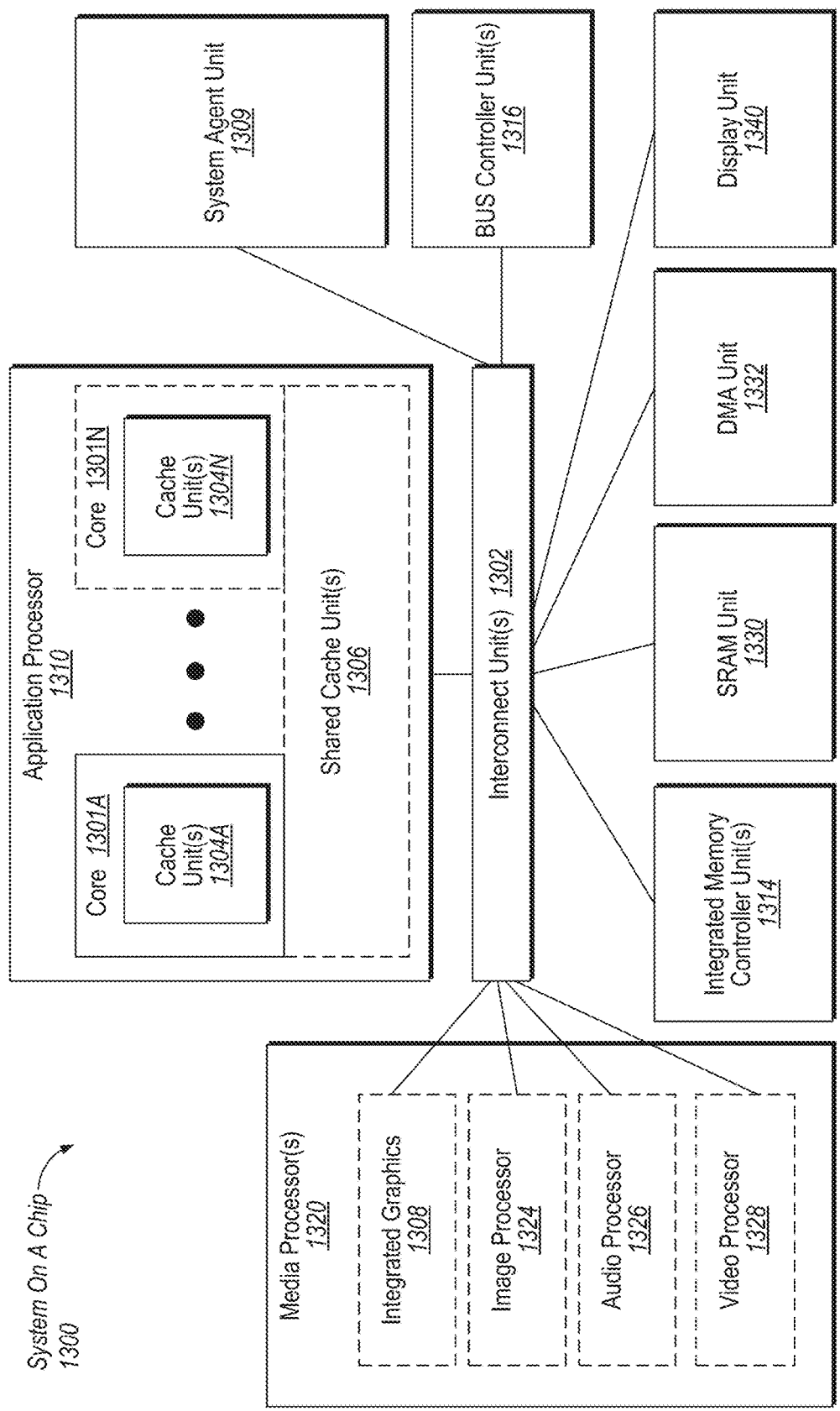
FIG. 13 is a block diagram of a system-on-a-chip according to one implementation.

FIG. 13 is an exemplary system on a chip (SoC) that may include one or more of the cores 1301. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 13, shown is a block diagram of a SoC 1300 in accordance with an embodiment of the present disclosure. Also, dashed lined boxes are features on more advanced SoCs. In FIG. 13, an interconnect unit(s) 1302 is coupled to: an application processor 1310 which includes a set of one or more cores 1301A-N and shared cache unit(s) 1306; a system agent unit 1309; a bus controller unit(s) 1316; an integrated memory controller unit(s) 1314; a set or one or more media processors 1320 which may include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays. The embodiments of the pages additions and content copying can be implemented in SoC 1300.

Figure 14:
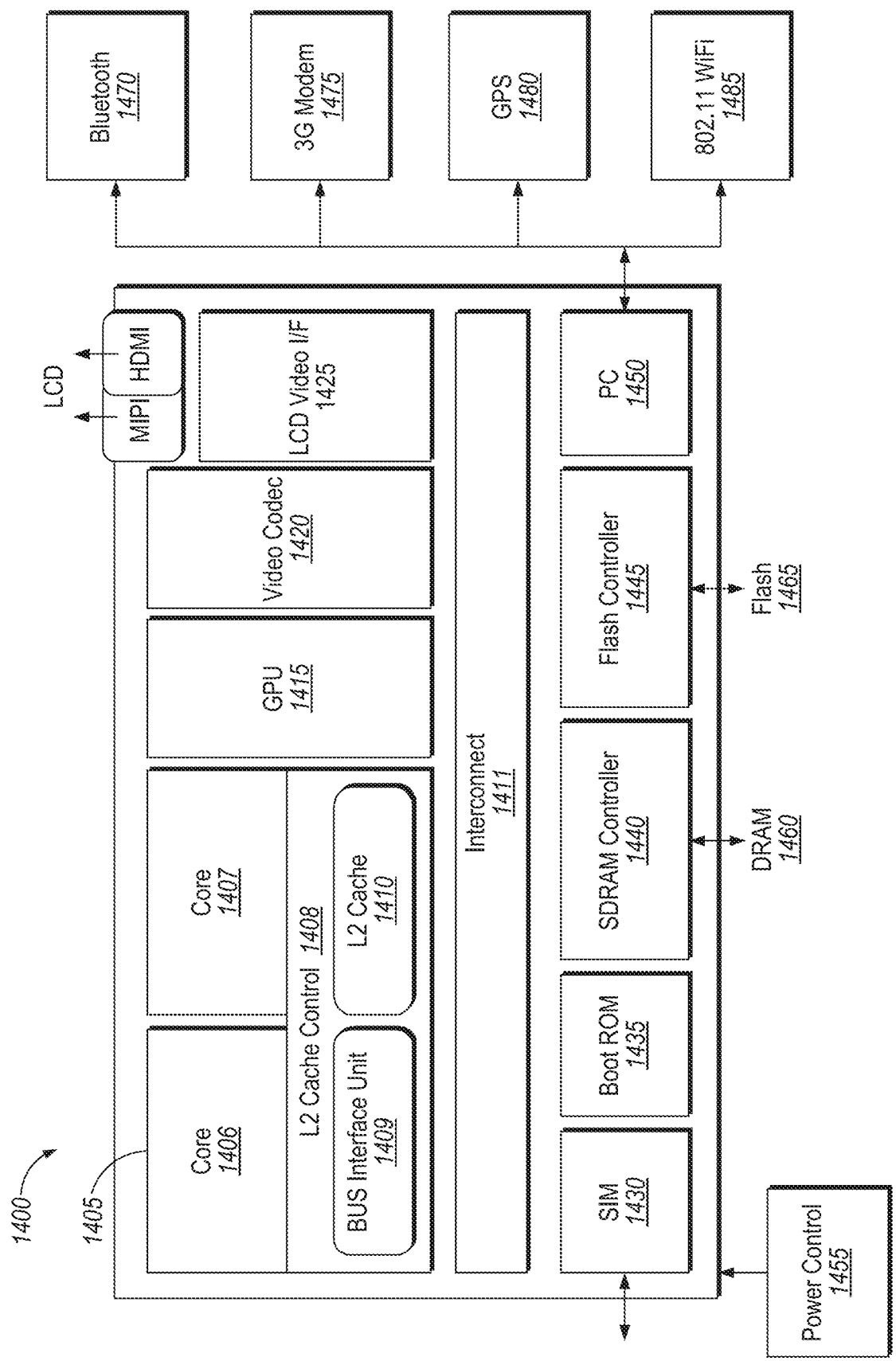
FIG. 14 illustrates another implementation of a block diagram for a computing system.

Turning next to FIG. 14, an embodiment of a system on-chip (SoC) design in accordance with embodiments of the disclosure is depicted. As an illustrative example, SoC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the lightweight secure architecture 100 with PEL 110 can be implemented in SoC 1400.

Here, SoC 1400 includes 2 cores—1406 and 1407. Similar to the discussion above, cores 1406 and 1407 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1411 includes an on-chip interconnect, such as an IOSF, AMBA, or other interconnects discussed above, which can implement one or more aspects of the described disclosure.

Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the embodiments described herein.

In addition, the system illustrates peripherals for communication, such as a Bluetooth module 1470, 3G modem 1475, GPS 1480, and Wi-Fi 1485. Note as stated above, a UE includes a radio for communication. As a result, these peripheral communication modules may not all be included. However, in a UE some form of a radio for external communication should be included.

Figure 15:
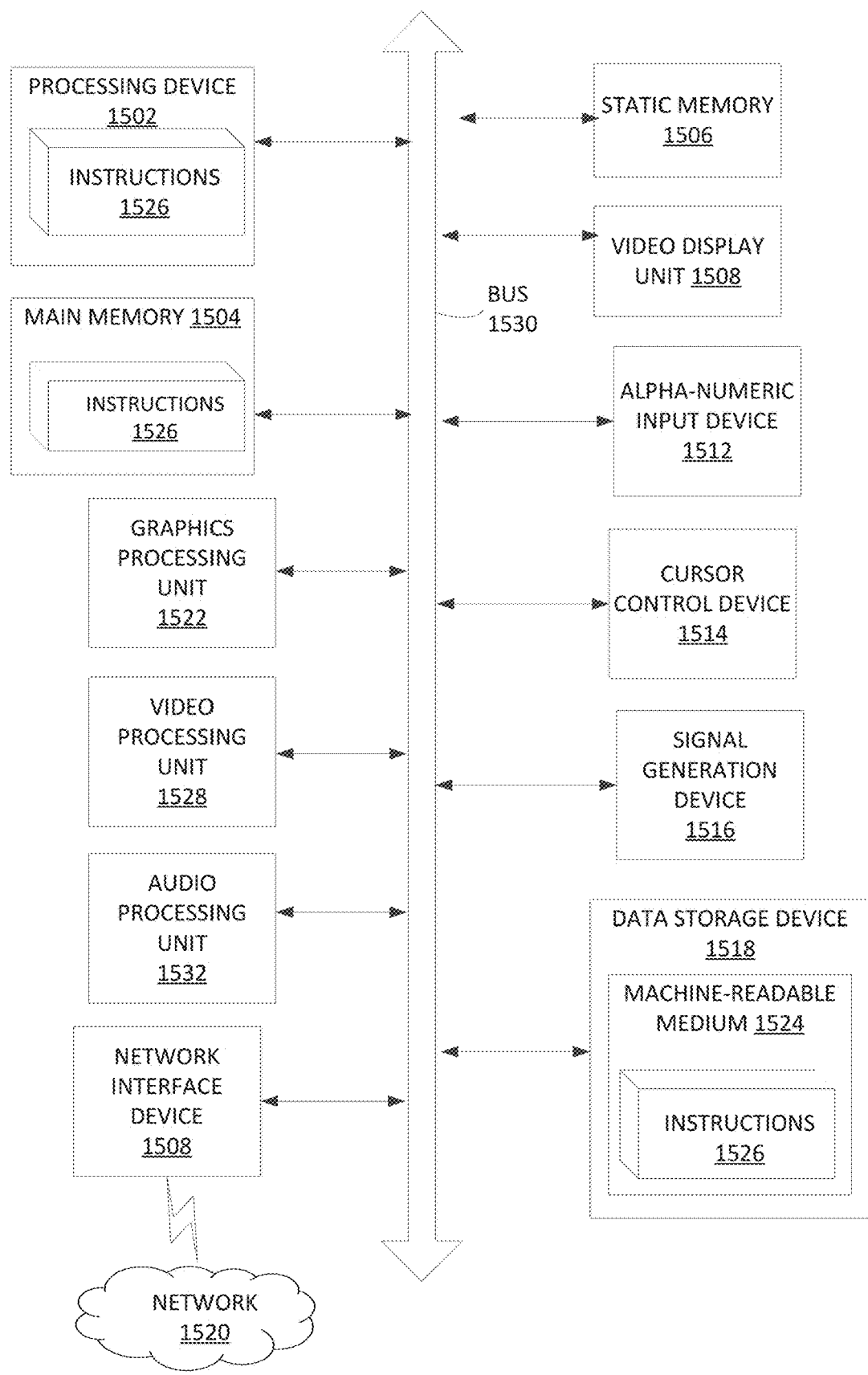
FIG. 15 illustrates another implementation of a block diagram for a computing system.

FIG. 15 illustrates a diagrammatic representation of a machine in the example form of a computing system 1500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the lightweight secure architecture 100 with PEL 110 can be implemented in computing system 1500.

The computing system 1500 includes a processing device 1502, main memory 1504 (e.g., read-only memory (ROM), flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1518, which communicate with each other via a bus 1530.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. In one embodiment, processing device 1502 may include one or processor cores. The processing device 1502 is configured to execute the instructions 1526 (e.g., processing logic) for performing the operations discussed herein. In one embodiment, processing device 1502 can include the lightweight secure architecture 100 of FIG. 1. In another embodiment, processing device 1502 is microprocessor 500 of FIG. 4. Alternatively, the computing system 1500 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1500 may further include a network interface device 1508 communicably coupled to a network 1520. The computing system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a signal generation device 1516 (e.g., a speaker), or other peripheral devices. Furthermore, computing system 1500 may include a graphics processing unit 1522, a video processing unit 1528 and an audio processing unit 1532. In another embodiment, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1518 may include a computer-readable storage medium 1524 on which is stored instructions 1526 (e.g., software) embodying any one or more of the methodologies of functions described herein. The instructions 1526 (e.g., software) may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502, such as the lightweight secure architecture 100 described with respect to FIG. 1, and/or a software library containing methods that call the above applications. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: a core comprising a single thread of execution, wherein the core comprises: a) a bus unit to couple to a main memory; b) a prefetch unit coupled to the bus unit; and c) a page unit coupled to the prefetch unit, wherein the page unit comprises policy enforcement logic (PEL), the page unit to partition the main memory into an unprotected region comprising a plurality of unsecure domains, a secure domain region comprising a plurality of secure domains, and a reserved region comprising a secure domain cache (SDC), wherein the page unit restricts access to the plurality of secure domains by applications executing by the processor core to provide hardware-based, trusted execution of the applications, wherein, in response to a memory request at the page unit from an application executing in a current domain indicated in the memory request, the page unit is to map a current virtual address (VA) to a current physical address (PA) using a page table, wherein the PEL is to: a) read, from the SDC, a domain value (DID) and a VA value that correspond to the current PA; b) grant access when: 1) the current domain and the DID correspond to the unprotected region; or 2) the current domain and the DID correspond to the secure domain region, the current domain is equal to the DID, and the current VA is equal to the VA value; and 3) grant data access and deny code access when the current domain corresponds to the secure domain region and the DID corresponds to the unprotected region.

In Example 2, the processor core of Example 1, wherein the PEL to deny access when: 1) the current domain corresponds to the unprotected region and the DID corresponds to the secure domain region; or 2) the current domain and the DID correspond to the secure domain region and at least one of the current domain is not equal to the DID or the current VA is not equal to the VA value.

In Example 3, the processor core of any one of Examples 1-2, wherein the reserved region further comprises secure domain metadata (SDM), and the processor to: 1) receive a DCREATE instruction to create a new secure domain; 2) search the SDM for an empty slot; 3) in response to finding the empty slot, fill the empty slot with a base VA to create the new secure domain; and 4) in response to not finding an empty slot, return an error.

In Example 4, the processor core of any one of Examples 1-3 is further to: 1) receive a DADD instruction to add a page to a first secure domain; 2) tag a physical page corresponding to the first secure domain with a secure domain tag (DT); 3) store the DT in the SDC; and 4) add, to the SDC, a first VA value of the page, wherein the physical page is mapped to the first VA value in a page table of the page.

In Example 5, the processor core of any one of Examples 1-4, wherein the reserved region further comprises secure domain metadata (SDM), the processor to: 1) receive a DENTER instruction to enter a first secure domain from a first current domain, wherein the first current domain is an unsecure domain; 2) find the SDM; 3) start executing from a base VA; 4) save a next enhanced instruction pointer (EIP) and other context before switching to the first secure domain; 5) set the first current domain to the first secure domain; and 6) enter the first secure domain.

In Example 6, the processor core of any one of Examples 1-5 is to: 1) receive a DEXIT instruction to exit a first secure domain; 2) exit from the first secure domain to an unsecure domain; and 3) signal an end of execution of the first secure domain.

In Example 7, the processor core of any one of Examples 1-6 is to: 1) receive a DREMOVE instruction to remove a page from a first secure domain; and 2) update an entry in the SDC corresponding to the page removed from first secure domain, wherein the entry is to be used by other secure domains in response to the processor updating the entry.

In Example 8, the processor core of any one of Examples 1-7, wherein the reserved region further comprises secure domain metadata (SDM) and the processor to: 1) receive a DDESTROY instruction to remove a first secure domain; and 2) update an entry in SDM corresponding to the first secure domain, wherein the entry is to be reused in response to the processor updating the entry.

In Example 9, the processor core of any one of Examples 1-8, wherein the processor is a memory management unit (MMU)-based processor core with access control logic.

In Example 10, the processor core of any one of Examples 1-9, wherein the PEL performs single threaded execution by a single hardware thread and performs direct mapping in access control for simple lookup.

In Example 11, the processor core of any one of Examples 1-10, wherein the PEL restricts mapping to a region of dynamic random access memory (DRAM) and restricts total number of secure domains, wherein the secure domains are to be cached within a translation lookaside buffer (TLB).

Various embodiments may have different combinations of the structural features described above. For instance, all optional features of the computing system described above may also be implemented with respect to the method or process described herein and specifics in the examples may be used anywhere in one or more embodiments.

Example 12 is a method comprising: 1) partitioning, by a page unit of a core of a processor, a main memory into an unprotected region comprising a plurality of unsecure domains, a secure domain region comprising a plurality of secure domains, and a reserved region comprising a secure domain cache (SDC), wherein the core comprises a single thread of execution, the core comprising a bus unit to couple to the main memory, a prefetch unit coupled to the bus unit, and the page unit coupled to the prefetch unit, wherein the page unit comprises policy enforcement logic (PEL); 2) restricting, by the page unit, access to the plurality of secure domains by applications executing by the core to provide hardware-based, trusted execution of the applications; 3) receiving a memory request at the page unit from an application executing in a current domain; 4) mapping a current virtual address (VA) to a current physical address (PA) using a page table in response to the receiving of the memory request; 5) reading, by the PEL from the SDC, a domain value (DID) and a VA value that correspond to the current PA; 6) granting access when: a) the current domain and the DID correspond to the unprotected region; or b) the current domain and the DID correspond to the secure domain region, the current domain is equal to the DID, and the current VA is equal to the VA value; and c) granting data access and denying code access when the current domain corresponds to the secure domain region and the DID corresponds to the unprotected region.

In Example 13, the method of Example 12, further comprising denying access when: 1) the current domain corresponds to the unprotected region and the DID corresponds to the secure domain region; or 2) the current domain and the DID correspond to the secure domain region and at least one of the current domain is not equal to the DID or the current VA is not equal to the VA value.

In Example 14, the method of Examples 12-13, wherein the reserved region further comprises secure domain metadata (SDM), the method further comprising: 1) receiving, by the processor, a DCREATE instruction to create a new secure domain; 2) searching the SDM for an empty slot; 3) in response to finding the empty slot, filling the empty slot with a base VA to create the new secure domain; and 4) in response to not finding an empty slot, returning an error.

In Example 15, the method of Examples 12-14, further comprising: 1) receiving, by the processor, a DADD instruction to add a page to a first secure domain; 2) tagging a physical page corresponding to the first secure domain with a secure domain tag (DT); 3) storing the DT in the SDC; and 4) adding, to the SDC, a first VA value of the page, wherein the physical page is mapped to the first VA value in a page table of the page.

In Example 16, the method of Examples 12-15, wherein the reserved region further comprises secure domain metadata (SDM), the method further comprising: 1) receiving, by the processor, a DENTER instruction to enter a first secure domain from a first current domain, wherein the first current domain is an unsecure domain; 2) finding the SDM; 3) starting executing from a base VA; 4) saving a next enhanced instruction pointer (EIP) and other context before switching to the first secure domain; 5) setting the first current domain to the first secure domain; and 6) entering the first secure domain.

In Example 17, the method of Examples 12-16, further comprising: 1) receiving, by the processor, a DEXIT instruction to exit a first secure domain; 2) exiting from the first secure domain to an unsecure domain; and 3) signaling an end of execution of the first secure domain.

In Example 18, the method of Examples 12-17, further comprising: 1) receiving, by the processor, a DREMOVE instruction to remove a page from a first secure domain; 2) removing the page from the first secure domain; and 3) updating an entry in the SDC corresponding to the page removed from first secure domain, wherein the entry is to be used by other secure domains in response to the processor updating the entry.

In Example 19, the method of Examples 12-18, wherein the reserved region further comprises secure domain metadata (SDM), the method further comprising: 1) receiving, by the processor, a DDESTROY instruction to remove a first secure domain; 2) removing the first secure domain; and 3) updating an entry in SDM corresponding to the first secure domain, wherein the entry is to be reused in response to the processor updating the entry.

In Example 20, the method of Examples 12-19, wherein the processor is a memory management unit (MMU)-based processor core with access control logic.

Example 21, is a system comprising: 1) a main memory partitioned into an unprotected region comprising a plurality of unsecure domains, a secure domain region comprising a plurality of secure domains, and a reserved region comprising a secure domain cache (SDC); and 2) a processor comprising: a) a core comprising a single thread of execution, wherein the core comprises: b) a bus unit to couple to the main memory; c) a prefetch unit coupled to the bus unit; and d) a page unit coupled to the prefetch unit, wherein the page unit comprises policy enforcement logic (PEL), wherein the page unit restricts access to the plurality of secure domains by applications executing by the processor core to provide hardware-based, trusted execution of the applications, wherein, in response to a memory request at the page unit from an application executing in a current domain, the page unit is to map a current virtual address (VA) to a current physical address (PA) using a page table, wherein the PEL is to: 1) read, from the SDC, a domain value (DID) and a VA value that correspond to the current PA; 2) grant access when: a) the current domain and the DID correspond to the unprotected region; or b) the current domain and the DID correspond to the secure domain region, the current domain is equal to the DID, and the current VA is equal to the VA value; and c) grant data access and deny code access when the current domain corresponds to the secure domain region and the DID corresponds to the unprotected region.

In Example 22, the system of Example 21, wherein the PEL to deny access when: 1) the current domain corresponds to the unprotected region and the DID corresponds to the secure domain region; or 2) the current domain and the DID correspond to the secure domain region and at least one of the current domain is not equal to the DID or the current VA is not equal to the VA value.

In Example 23, the system of Examples 21-22, wherein the processor is a memory management unit (MMU)-based processor core with access control logic.

In Example 24, the system of Examples 21-23, wherein the PEL: 1) restricts mapping to a region of dynamic random access memory (DRAM); and 2) restricts total number of secure domains, wherein the secure domains are to be cached within a translation lookaside buffer (TLB).

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a core comprising a single hardware thread of execution, wherein the core comprises a page unit, wherein the page unit is to:
        execute an instruction to manage or access a secure domain cache (SDC) of a reserved region of main memory, wherein instruction latency of the instruction is 1 to 18 cycles, wherein an unprotected region of the main memory comprises a plurality of unsecure domains, and wherein a secure domain region of the main memory comprises a plurality of secure domains;
        receive a memory request from an application executing in a current domain indicated in the memory request;
        map a current virtual address (VA) corresponding to the memory request to a current physical address (PA) using a page table;
        determine whether to grant data access and whether to grant code access based on data from the SDC and the current PA to provide hardware-based, trusted execution of the application,
        read, from the SDC, a domain value and a VA value that correspond to the current PA; and
        grant the data access and the code access responsive to determining:
            the current domain and the domain value correspond to the unprotected region; or
            the current domain and the domain value correspond to the secure domain region, the current domain is equal to the domain value, and the current VA is equal to the VA value.

2. The processor of claim 1, wherein the page unit is to perform, using the single hardware thread, single threaded execution to:
    grant the data access and deny the code access responsive to determining the current domain corresponds to the secure domain region and the domain value corresponds to the unprotected region; and
    deny the data access and the code access responsive to determining:
        the current domain corresponds to the unprotected region and the domain value corresponds to the secure domain region; or
        the current domain and the domain value correspond to the secure domain region and at least one of the current domain is not equal to the domain value or the current VA is not equal to the VA value.

3. The processor of claim 2, wherein the reserved region further comprises secure domain metadata (SDM), wherein the processor is to:
    receive a first instruction to create a new secure domain;
    search the SDM for an empty slot;
    in response to finding the empty slot, fill the empty slot with a base VA to create the new secure domain; and
    in response to not finding an empty slot, return an error.

4. The processor of claim 2, wherein the processor is to:
    receive a second instruction to add a page to a first secure domain;
    tag a physical page corresponding to the first secure domain with a secure domain tag (DT);
    store the DT in the SDC; and
    add, to the SDC, a first VA value of the page, wherein the physical page is mapped to the first VA value in a respective page table of the page.

5. The processor of claim 2, wherein the reserved region further comprises secure domain metadata (SDM), wherein the processor is to:
    receive a third instruction to enter a first secure domain from a first current domain, wherein the first current domain is an unsecure domain;
    find the SDM;
    start executing from a base VA;

save a next enhanced instruction pointer (EIP) and other context before switching to the first secure domain;
set the first current domain to the first secure domain; and enter the first secure domain.

6. The processor of claim 2, wherein the processor is to:
receive a fourth instruction to exit a first secure domain;
exit from the first secure domain to an unsecure domain; and
signal an end of execution of the first secure domain.

7. The processor of claim 2, wherein the processor is to:
receive a fifth instruction to remove a page from a first secure domain; and
update an entry in the SDC corresponding to the page removed from first secure domain, wherein the entry is to be used by other secure domains in response to the processor updating the entry.

8. The processor of claim 2, wherein the reserved region further comprises secure domain metadata (SDM), wherein the processor is to:
receive a sixth instruction to remove a first secure domain; and
update an entry in the SDM corresponding to the first secure domain, wherein the entry is to be reused in response to the processor updating the entry.

9. The processor of claim 2, wherein the processor is a memory management unit (MMU)-based processor core with access control logic.

10. The processor of claim 2, wherein the core is a single core of the processor, wherein the page unit is to perform direct mapping in access control for simple lookup.

11. The processor of claim 2, wherein the page unit is to:
restrict mapping to a region of dynamic random access memory (DRAM); and
restrict total number of secure domains, wherein the secure domains are to be cached within a translation lookaside buffer (TLB).

12. A method comprising:
executing, by a page unit of a core of a processor, an instruction to manage or access a secure domain cache (SDC) of a reserved region of a main memory, wherein instruction latency of the instruction is 1 to 18 cycles, wherein an unprotected region of the main memory comprises a plurality of unsecure domains, and wherein a secure domain region of the main memory comprises a plurality of secure domains;
receiving, by the page unit, a memory request from an application executing in a current domain;
mapping, by the page unit, a current virtual address (VA) corresponding to the memory request to a current physical address (PA) using a page table;
determining whether to grant data access and whether to grant code access based on data from the SDC and the current PA to provide hardware-based, trusted execution of the application;
reading from the SDC, a domain value and a VA value that correspond to the current PA; and
granting the data access and denying the code access responsive to determining the current domain corresponds to the secure domain region and the domain value corresponds to the unprotected region.

13. The method of claim 12 further comprising:
granting the data access and the code access responsive to determining:
the current domain and the domain value correspond to the unprotected region; or
the current domain and the domain value correspond to the secure domain region, the current domain is equal to the domain value, and the current VA is equal to the VA value; and
denying the data access and the code access responsive to determining:
the current domain corresponds to the unprotected region and the domain value corresponds to the secure domain region; or
the current domain and the domain value correspond to the secure domain region and at least one of the current domain is not equal to the domain value or the current VA is not equal to the VA value.

14. The method of claim 13, wherein the reserved region further comprises secure domain metadata (SDM), the method further comprising:
receiving, by the processor, a first instruction to create a new secure domain;
searching the SDM for an empty slot;
in response to finding the empty slot, filling the empty slot with a base VA to create the new secure domain; and
in response to not finding an empty slot, returning an error.

15. The method of claim 13 further comprising:
receiving, by the processor, a second instruction to add a page to a first secure domain;
tagging a physical page corresponding to the first secure domain with a secure domain tag (DT);
storing the DT in the SDC; and
adding, to the SDC, a first VA value of the page, wherein the physical page is mapped to the first VA value in a respective page table of the page.

16. The method of claim 13, wherein the reserved region further comprises secure domain metadata (SDM), the method further comprising:
receiving, by the processor, a third instruction to enter a first secure domain from a first current domain, wherein the first current domain is an unsecure domain;
finding the SDM;
starting executing from a base VA;
saving a next enhanced instruction pointer (EIP) and other context before switching to the first secure domain;
setting the first current domain to the first secure domain; and
entering the first secure domain.

17. The method of claim 13 further comprising:
receiving, by the processor, a fourth instruction to exit a first secure domain;
exiting from the first secure domain to an unsecure domain; and
signaling an end of execution of the first secure domain.

18. The method of claim 13 further comprising:
receiving, by the processor, a fifth instruction to remove a page from a first secure domain;
removing the page from the first secure domain; and
updating an entry in the SDC corresponding to the page removed from first secure domain, wherein the entry is to be used by other secure domains in response to the processor updating the entry.

19. The method of claim 13, wherein the reserved region further comprises secure domain metadata (SDM), the method further comprising:
receiving, by the processor, a sixth instruction to remove a first secure domain;
removing the first secure domain; and
updating an entry in the SDM corresponding to the first secure domain, wherein the entry is to be reused in response to the processor updating the entry.

20. The method of claim 13, wherein the processor is a memory management unit (MMU)-based processor core with access control logic.

21. A system comprising:
a main memory partitioned into an unprotected region comprising a plurality of unsecure domains, a secure domain region comprising a plurality of secure domains, and a reserved region comprising a secure domain cache (SDC); and
a processor comprising:
  a core comprising a single hardware thread of execution, wherein the core comprises a page unit, wherein the page unit is to:
    execute an instruction to manage or access the SDC, wherein instruction latency of the instruction is 1 to 18 cycles;
    receive a memory request from an application executing in a current domain;
    map a current virtual address (VA) corresponding to the memory request to a current physical address (PA) using a page table;
    determine whether to grant data access and whether to grant code access based on data from the SDC and the current PA to provide hardware-based, trusted execution of the application;
    read, from the SDC, a domain value and a VA value that correspond to the current PA; and
    deny the data access and the code access responsive to determining:
      the current domain corresponds to the unprotected region and the domain value corresponds to the secure domain region; or
      the current domain and the domain value correspond to the secure domain region and at least one of the current domain is not equal to the domain value or the current VA is not equal to the VA value.

22. The system of claim 21, wherein the page unit is to:
grant the data access and the code access responsive to determining:
  the current domain and the domain value correspond to the unprotected region; or
  the current domain and the domain value correspond to the secure domain region, the current domain is equal to the domain value, and the current VA is equal to the VA value; and
grant the data access and deny the code access responsive to determining the current domain corresponds to the secure domain region and the domain value corresponds to the unprotected region.

23. The system of claim 22, wherein the processor is a memory management unit (MMU)-based processor core with access control logic.

24. The system of claim 22, wherein the page unit is to:
restrict mapping to a region of dynamic random access memory (DRAM); and
restrict total number of secure domains, wherein the secure domains are to be cached within a translation lookaside buffer (TLB).

* * * * *